United States Patent
Ikegami et al.

(10) Patent No.: US 7,472,553 B2
(45) Date of Patent: Jan. 6, 2009

(54) HUMIDITY CONTROLLER

(75) Inventors: Shuji Ikegami, Osaka (JP); Tomohiro Yabu, Osaka (JP)

(73) Assignee: Daikin Industries, Ltd., Osaka-Shi (JP)

( * ) Notice: Subject to any disclaimer, the term of this patent is extended or adjusted under 35 U.S.C. 154(b) by 451 days.

(21) Appl. No.: 10/555,081

(22) PCT Filed: May 24, 2004

(86) PCT No.: PCT/JP2004/007632

§ 371 (c)(1),
(2), (4) Date: Oct. 31, 2005

(87) PCT Pub. No.: WO2004/106813

PCT Pub. Date: Sep. 12, 2004

(65) Prior Publication Data

US 2007/0028639 A1 Feb. 8, 2007

(30) Foreign Application Priority Data

May 27, 2003 (JP) .................. 2003-149210

(51) Int. Cl.
*F25D 17/06* (2006.01)
*F25B 17/00* (2006.01)
(52) U.S. Cl. .................. 62/94; 62/176.1; 62/232; 62/271
(58) Field of Classification Search .............. 62/94, 62/127, 157, 176.1, 176.6, 232, 271
See application file for complete search history.

(56) References Cited

U.S. PATENT DOCUMENTS 5,725,639 A 3/1998 Khelifa et al.

2005/0150237 A1* 7/2005 Yabu et al. .................. 62/94

FOREIGN PATENT DOCUMENTS

| AU | 2004219772 A1 | 9/2004 |
| JP | 07-265649 A | 10/1995 |
| JP | 08-178399 A | 7/1996 |
| JP | 08-189667 A | 7/1996 |

(Continued)

*Primary Examiner*—Marc E Norman
(74) *Attorney, Agent, or Firm*—Birch, Stewart, Kolasch & Birch, LLP

(57) ABSTRACT

A humidity controller apparatus (10) includes a refrigerant circuit provided with first and second heat exchangers (61, 62). An adsorbent is supported on the surface of each of the first and second heat exchangers (61, 62). The refrigerant circuit is configured to allow for switching of the circulation direction of a refrigerant by operation of a four-way selector valve. In addition, in the humidity controller apparatus (10), a switching mechanism (50) switches the distribution routes of air streams. The humidity controller apparatus (10) operates the four-way selector valve and the switching mechanism (50), whereby a first air stream is dehumidified in the heat exchanger (61) or (62), whichever is acting as an evaporator while, on the other hand, a second air stream is humidified in the heat exchanger (61) or (62), whichever is acting as a condenser. In the humidity controller apparatus (10), the operation of the refrigerant circuit and the switching time interval of the air stream distribution routes are set depending on the load of humidity control. As the humidity control load increases, the switching time interval is set smaller.

7 Claims, 18 Drawing Sheets

FOREIGN PATENT DOCUMENTS

| | | |
|---|---|---|
| JP | 2001-91001 A | 4/2001 |
| JP | 2001-201106 A | 7/2001 |
| JP | 2003-028458 A | 1/2003 |
| JP | 2003-148768 A | 5/2003 |
| JP | 2003-232539 A | 8/2003 |
| JP | 2003-287241 A | 10/2003 |
| WO | WO-02/25183 A1 | 3/2002 |
| WO | WO-03/008871 A1 | 1/2003 |
| WO | WO-03/008872 A1 | 1/2003 |
| WO | WO-2004/081460 A1 | 9/2004 |

\* cited by examiner (X-X ARROW VIEW)

(Y-Y ARROW VIEW)

(X-X ARROW VIEW)

(Y-Y ARROW VIEW)

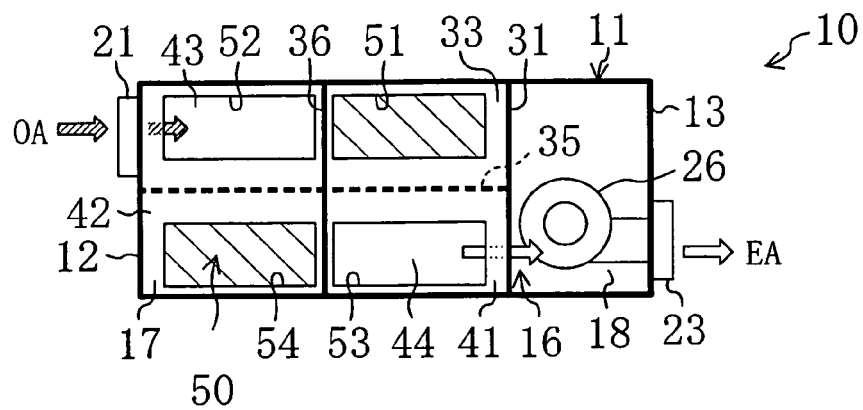
FIG. 7A (X-X ARROW VIEW)
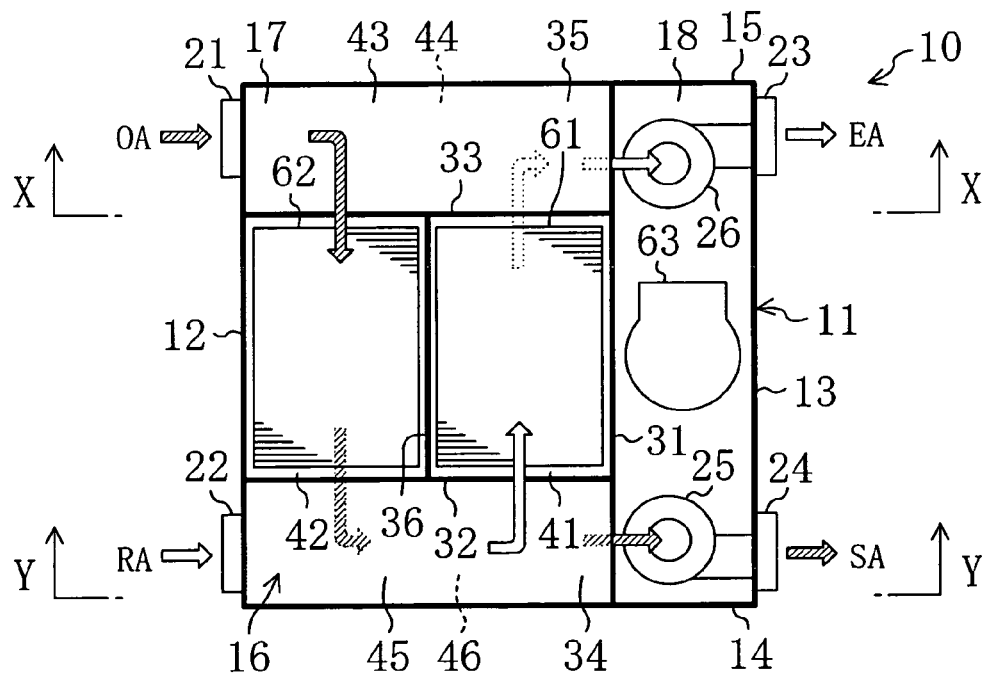
FIG. 7B
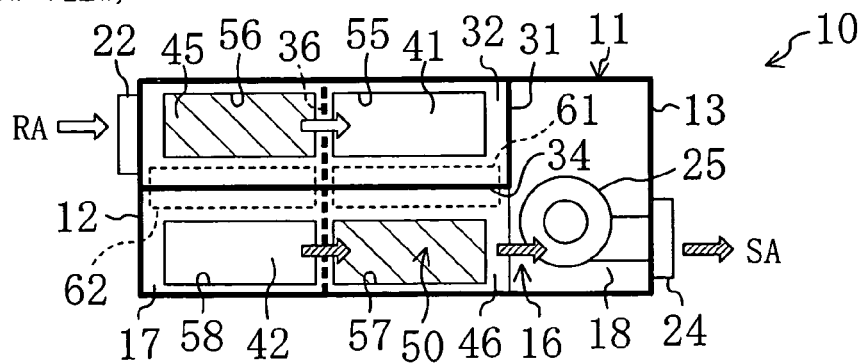
FIG. 7C (Y-Y ARROW VIEW)

FIG. 8A
(X-X ARROW VIEW)
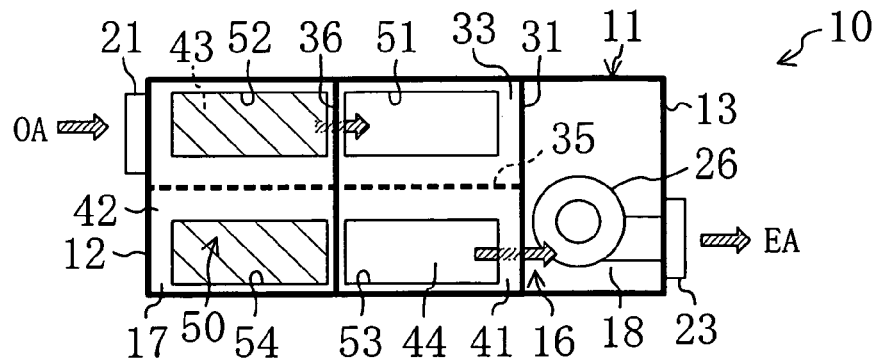
FIG. 8B
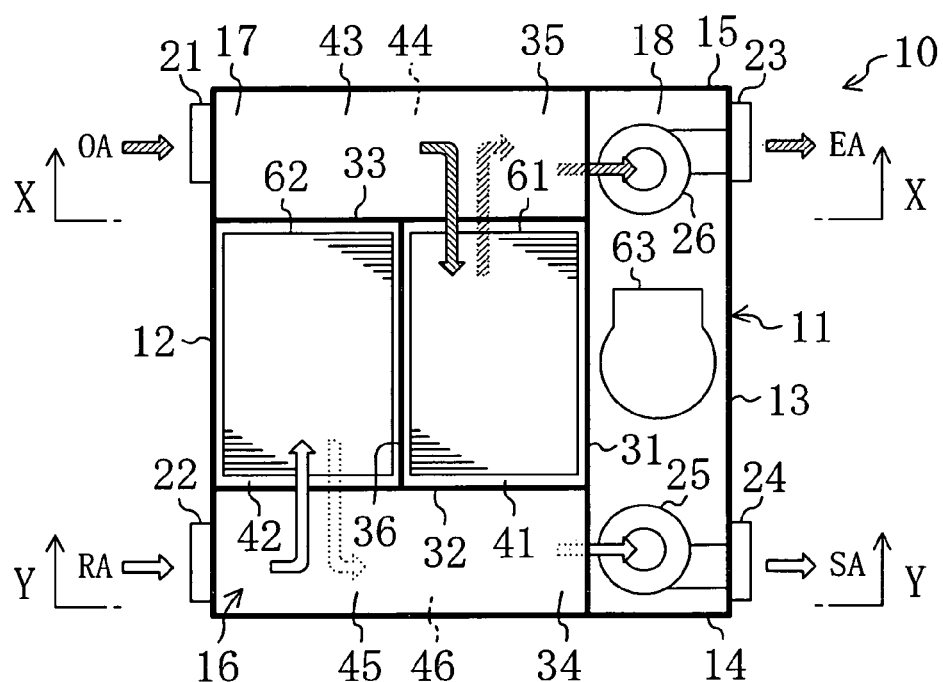
FIG. 8C
(Y-Y ARROW VIEW)

(X-X ARROW VIEW)

(Y-Y ARROW VIEW)

(X-X ARROW VIEW)

(Y-Y ARROW VIEW)

HUMIDITY CONTROLLER

TECHNICAL FIELD

The present invention relates to humidity controller apparatuses which operate to regulate the humidity of air, and it relates more specifically to a humidity controller apparatus which performs a so-called batch running operation.

BACKGROUND ART

Humidity controller apparatuses for regulating the humidity of air by making utilization of an adsorbent and a refrigeration cycle have been known in the prior art. One such humidity controller apparatus is disclosed in for example Japanese Patent Application Publication (Kokai) No. 1996-189667. The humidity controller apparatus is so configured as to perform a so-called batch running operation.

The above-mentioned humidity controller apparatus includes two adsorption units. Each adsorption unit is made up of a mesh receptacle filled with an adsorbent and a refrigerant pipe extending through the mesh receptacle. The refrigerant pipe of each adsorption unit is in fluid connection with a refrigerant circuit which performs a refrigeration cycle. In addition, the humidity controller apparatus is provided with dampers for switching of the routes of air streams which are delivered, respectively, to the adsorption units.

When the above-descried humidity controller apparatus is in operation, the compressor of the refrigerant circuit is operated to perform a refrigeration cycle in which one of the two adsorption units acts as an evaporator while the other adsorption unit acts as a condenser. In addition, a four-way selector valve in the refrigerant circuit is operated to allow for switching of the direction in which the refrigerant is circulated and, as a result, each adsorption unit functions alternately as an evaporator and as a condenser.

When the humidity controller apparatus is in a humidification mode of operation, a stream of supply air flowing from outside a room to inside the room is introduced into one adsorption unit that becomes a condenser. The supply air stream is humidified by moisture desorbed from the adsorbent. At that time, a stream of exhaust air flowing from inside the room to outside the room is introduced into the other adsorption unit that becomes an evaporator. Moisture present in the exhaust air stream is collected by the adsorbent. On the other hand, when the humidity controller apparatus is in a dehumidification mode of operation, a stream of supply air flowing from outside the room to inside the room is introduced into one adsorption unit that becomes an evaporator. Moisture present in the supply air stream is adsorbed on the adsorbent. At that time, a stream of exhaust air flowing from inside the room to outside the room is introduced into the other adsorption unit that becomes a condenser. Moisture desorbed from the adsorbent is discharged to outside the room, together with the exhaust air stream.

In addition, as a means having the same function as the above-described adsorption units, a heat exchange member, as disclosed in for example Japanese Patent Application Publication (Kokai) No. 1995-265649, has been known in the art. In the heat exchange member, plate-like fins are arranged around a copper pipe and an adsorbent is supported on the surface of the copper pipe and the surface of each fin. And, the heat exchange member is so configured as to effect heating and cooling of the adsorbent by a fluid flowing through the copper pipe.

In addition, a humidity controller apparatus which performs a batch running operation, as disclosed in for example Japanese Patent Application Publication (Kokai) No. 2003-28458, has been known in the art. The humidity controller apparatus has two adsorption elements, wherein many air flow paths are formed in each adsorption element. When a first air stream is dehumidified in the first adsorption element, a second air stream heated in a condenser of a heat pump is delivered to the second adsorption element so that the adsorbent is regenerated. On the other hand, when a first air stream is dehumidified in the second adsorption element, a heated second air stream is delivered to the first adsorption element so that the adsorbent is regenerated. The humidity controller apparatus alternately repeatedly performs the above-described two operations, thereby to supply either a dehumidified first air stream or a humidified second air stream to an indoor space.

PROBLEMS THAT INVENTION INTENDS TO SOLVE

The problem with the above-described prior art humidity controller apparatuses is that no consideration is made at all on adjustment of the capability to control the humidity. This gives rise to the possibility that, for the indoor latent heat load, an excess or deficiency in the humidity control capability of the humidity controlling apparatus occurs. As a result, comfortable indoor conditions may not be provided sufficiently and, in addition, energy savings in the humidity controller apparatus may not be accomplished sufficiently either.

With the above-described problems in mind, the present invention was made. Accordingly, an object of the present invention is to enable, in a humidity controller apparatus which performs a so-called batch running operation, adjustment of the humidity control capability of the humidity controller apparatus for the purpose of assuring comfort and accomplishing energy savings of the humidity controller apparatus.

DISCLOSURE OF THE INVENTION

A first invention is directed to a humidity controller apparatus which takes in a first air stream and a second air stream and supplies to an indoor space either the first air stream dehumidified or the second air stream humidified. In the humidity controller apparatus of the first invention: the humidity controller apparatus comprises a first adsorption unit (61) and a second adsorption unit (62), each of the first and second adsorption units (61, 62) having a respective adsorbent which is brought into contact with air; the humidity controller apparatus is configured to perform, repeatedly alternately at a predetermined switching time interval, a first operation in which the second air stream is humidified as a result of regeneration of the adsorbent of the first adsorption unit (61) while, simultaneously, the first air stream is dehumidified in the second adsorption unit (62) and a second operation in which the second air stream is humidified as a result of regeneration of the adsorbent of the second adsorption unit (62) while, simultaneously, the first air stream is dehumidified in the first adsorption unit (61); and the humidity controller apparatus is provided with an interval set means (74) for setting the predetermined switching time interval depending on the load of the humidity controller apparatus.

A second invention according to the first invention is provided in which the interval set means (74) is configured to set the predetermined switching time interval such that the set value of the predetermined switching time interval decreases as the load of the humidity controller apparatus increases.

A third invention according to the first or second invention is provided in which: the humidity controller apparatus comprises a refrigerant circuit (60) in which a plurality of heat exchangers (61, 62) each supporting on its surface a respective adsorbent are connected, the refrigerant circuit (60) allowing for switching between a first refrigeration cycle operation in which the first heat exchanger (61) becomes a condenser while the second heat exchanger (62) becomes an evaporator and a second refrigeration cycle operation in which the second heat exchanger (62) becomes a condenser while the first heat exchanger (61) becomes an evaporator; and the refrigerant circuit (60) performs a first refrigeration cycle operation during the first operation while, on the other hand, the refrigerant circuit (60) performs a second refrigeration cycle operation during the second operation, and the first heat exchanger (61) and the second heat exchanger (62) constitute, respectively, a first adsorption unit and a second adsorption unit.

A fourth invention according to the third invention is provided in which the humidity controller apparatus comprises: a switching mechanism (50) for switching of the distribution routes of the first and second air streams in response to interswitching between the first operation and the second operation; and a switching control means (73) for performing a control operation so that the switching mechanism (50) pre-switches the distribution routes of air streams a predetermined length of time ahead of switching of the operation of the refrigerant circuit (60), when the second air stream has a higher temperature than the first air stream on the upstream side of the heat exchangers (61, 62).

A fifth invention according to the third invention is provided in which the humidity controller apparatus comprises: a switching mechanism (50) for switching of the distribution routes of the first and second air streams in response to interswitching between the first operation and the second operation; and a switching control means (73) for performing a control operation so that the switching mechanism (50) switches the distribution routes of air streams after an elapse of a predetermined length of time since switching of the operation of the refrigerant circuit (60), when the first air stream has a higher temperature than the second air stream on the upstream side of the heat exchangers (61, 62).

A sixth invention according to the third invention is provided in which: a compressor (63), disposed in the refrigerant circuit (60), is configured to be variable in capacity; and a capacity control means (71) is provided which varies the capacity of the compressor (63) at the same cycle as the cycle at which the operation of the refrigerant circuit (60) is switched.

A seventh invention according to the third invention is provided in which: a refrigerant expansion mechanism, disposed in the refrigerant circuit (60), is formed by an expansion valve (65) which is variable in opening; and an opening control means (72) is provided which varies the opening of the expansion valve (65) at the same cycle as the cycle at which the operation of the refrigerant circuit (60) is switched.

WORKING OPERATION

In the first invention, the first operation and the second operation are carried out in an interswitching manner. Interswitching between the first operation and the second operation is made periodically at intervals of a predetermined switching time. In the humidity controller apparatus (10) of the first invention, during the first operation, a second air stream is delivered to the first adsorption unit (61) and a first air stream is delivered to the second adsorption unit (62). In the first adsorption unit (61), the adsorbent is regenerated, and the second air stream is humidified by moisture desorbed from the adsorbent. In addition, in the second adsorption unit (62), moisture present in the first air stream is adsorbed on the adsorbent and, as a result, the first air stream is dehumidified. On the other hand, during the second operation, a first air stream is delivered to the first adsorption unit (61) and a second air stream is delivered to the second adsorption unit (62). In the first adsorption unit (61), moisture present in the first air stream is adsorbed on the adsorbent and, as a result, the first air stream is dehumidified. In the second adsorption unit (62), the adsorbent is regenerated, and the second air stream is humidified by moisture desorbed from the adsorbent.

In the first invention, the humidity controller apparatus (10) supplies either a dehumidified first air stream or a humidified second air stream to an indoor space. In other words, the humidity controller apparatus (10) may be configured so as to supply only a dehumidified first air stream (or only a humidified second air stream) into the room. In addition, the humidity controller apparatus (10) may be configured so as to operate switchably between a first mode of operation in which a dehumidified first air stream is supplied into an indoor space and a second mode of operation in which a humidified second air stream is supplied into the indoor space.

Furthermore, in the first invention, the humidity controller apparatus (10) is provided with the interval set means (74). The interval set means (74) sets switching time intervals depending on the load of the humidity controller apparatus (10). In the humidity controller apparatus (10), interswitching between the first operation and the second operation is made at a switching time interval established by the interval set means (74). The interval set means (74) makes an adjustment in the switching time interval, whereby the capability to control the humidity obtained in the humidity controller apparatus (10) is adjusted depending on the load of the humidity controller apparatus (10). Stated another way, as the switching time interval at which interswitching between the first and second operations is made is varied, the amount of dehumidification from the first air stream and the amount of humidification to the second air stream vary, and the humidity control capability of the humidity controller apparatus (10) varies.

In the second invention, the switching time interval is set shorter by the interval set means (74), as the load of the humidity controller apparatus (10) becomes greater. Here, in the humidity controller apparatus (10) which alternately selectively performs a first operation and a second operation, moisture adsorption/desorption for the adsorbent of the adsorption unit takes places intensively within a relatively short period of time after interswitching between the two operations. For example, with regard to moisture which is desorbed from the adsorbent of the first adsorption unit (61) during the first operation, most of the moisture will have been desorbed from the adsorbent shortly after the start of the first operation. In addition, with regard to moisture which is adsorbed on the adsorbent of the second adsorption unit (62) during the first operation, most of the moisture will have been adsorbed on the adsorbent shortly after the start of the first operation.

If the switching time interval is set longer to extend the time for which the first and second operations continue, this prolongs the period during which there occurs little moisture adsorption/desorption for the adsorbents. As a result, the humidity control capability of the humidity controller apparatus (10) falls. On the contrary, if the switching time interval is set shorter to reduce the time for which the first and second operations continue, this increases the frequency at which moisture adsorption/desorption for the adsorbents takes place intensively. As a result, the humidity control capability of the humidity controller apparatus (10) increases.

Therefore, the interval set means (74) is provided to set a switching time interval in the second invention, as described above, and the humidity control capability of the humidity controller apparatus (10) is increased or decreased proportionally to the increase and decrease in the load of the humidity controller apparatus (10).

In the third invention, two different refrigeration cycle operations are repeatedly carried out in alternation manner in the refrigerant circuit (60). In addition, the switching mechanism (50) switches the distribution routes of the first and second air streams in response to switching of the operation of the refrigerant circuit (60).

In the refrigerant circuit (60) of the third invention, during the first refrigeration cycle operation a second air stream is delivered to the first heat exchanger (61) which becomes a condenser while, on the other hand, a first air stream is delivered to the second heat exchanger (62) which becomes an evaporator. In the first heat exchanger (61), the adsorbent is regenerated as a result of heating by the refrigerant and desorbed moisture from the adsorbent is given to the second air stream. In addition, in the second heat exchanger (62), moisture present in the first air stream is adsorbed on the adsorbent and heat of adsorption generated at that time is absorbed by the refrigerant. On the other hand, during the second refrigeration cycle operation, a first air stream is delivered to the first heat exchanger (61) which becomes an evaporator while, on the other hand, a second air stream is delivered to the second heat exchanger (62) which becomes a condenser. In the first heat exchanger (61), moisture present in the first air stream is adsorbed on the adsorbent and heat of adsorption generated at that time is absorbed by the refrigerant. On the other hand, in the second heat exchanger (62), the adsorbent is regenerated as a result of heating by the refrigerant and desorbed moisture from the refrigerant is given to the second air stream.

In the fourth invention, the switching control means (73) of the humidity controller apparatus (10) controls the switching mechanism (50) so that the distribution routes of air streams are switched prior to switching of the operation of the refrigerant circuit (60). Such a control operation of the switching control means (73) is carried out if the second air stream has a higher temperature than the first air stream before passage through the heat exchangers (61, 62).

Suppose here that a second air stream is delivered to the first heat exchanger (61) acting as a condenser while a first air stream is delivered to the second heat exchanger (62) acting as an evaporator. In this state, in the invention as set forth in claim 4, the air distribution routes are switched. As a result, the first air stream is delivered to the first heat exchanger (61) and the second air stream is delivered to the second heat exchanger (62). After an elapse of a predetermined length of time since then, the refrigeration cycle operation of the refrigerant circuit (60) is switched.

Consequently, the first air stream of lower temperature than the previously-delivered second air stream is delivered to the first heat exchanger (61) converting from a condenser to an evaporator. As a result, the adsorbent disposed in the first heat exchanger (61) is precooled by the first air stream before the first heat exchanger (61) converts into an evaporator. On the other hand, the second air stream of higher temperature than the previously-delivered first air stream is delivered to the second heat exchanger (62) converting from an evaporator to a condenser. As a result, the adsorbent disposed in the second heat exchanger (62) is preheated by the second air stream before the second heat exchanger (62) converts into a condenser.

In the fifth invention, the switching control means (73) of the humidity controller apparatus (10) controls the switching mechanism (50) so that the distribution routes of air streams are switched after switching of the operation of the refrigerant circuit (60). Such a control operation of the switching control means (73) is carried out if the first air stream has a higher temperature than the second air stream before passage through the heat exchangers (61, 62).

Suppose here that a second air stream is delivered to the first heat exchanger (61) acting as a condenser while a first air stream is delivered to the second heat exchanger (62) acting as an evaporator. In this state, in the invention as set forth in claim 5, the refrigeration cycle operation of the refrigerant circuit (60) is switched with the air distribution routes held unchanged. After an elapse of a predetermined length of time since then, the air distribution routes are switched.

Consequently, the second air stream having a lower temperature than the first air stream is continuously supplied to the first heat exchanger (61) which has converted to an evaporator from a condenser for a predetermined length of time. And, the adsorbent disposed in the first heat exchanger (61) is cooled by both the refrigerant of the refrigerant circuit (60) and the second air stream and, thereafter, comes into contact with the first air stream. On the other hand, the first air stream having a higher temperature than the second air stream is continuously supplied to the second heat exchanger (62) which has converted to a condenser from an evaporator for a predetermined length of time. And, the adsorbent disposed in the second heat exchanger (62) is heated by both the refrigerant of the refrigerant circuit (60) and the first air stream and, thereafter, comes into contact with the second air stream.

In the sixth invention, the compressor (63) of the refrigerant circuit (60) is variable in capacity. The capacity of the compressor (63) is controlled by the capacity control means (71). The capacity control means (71) periodically increases and decreases the capacity of the compressor (63). The cycle at which the capacity of the compressor (63) is varied by the capacity control means (71) is the same as the cycle at which the refrigeration cycle operation of the refrigerant circuit (60) is switched. In other words, the capacity of the compressor (63) is adjusted regularly in response to switching of the refrigeration cycle operation of the refrigerant circuit (60).

As a specific constructional example of the capacity control means (71) in the sixth invention, there are two examples as described below.

A first constructional example of the capacity control means (71) in the sixth invention is a means which performs, every time the operation of the refrigerant circuit (60) is switched, a control operation of temporarily pre-decreasing the capacity of the compressor (63) prior to switching of the operation of the refrigerant circuit (60) and then increasing the capacity of the compressor (63) upon the switching of the operation of the refrigerant circuit (60).

In the first constructional example, the capacity control means (71) performs a predefined control operation every time the refrigeration cycle operation of the refrigerant circuit (60) is switched. In this control operation, the capacity control means (71) reduces in advance the capacity of the compressor (63) at the time of switching of the operation of the refrigerant circuit (60). To sum up, the refrigeration cycle operation of the refrigerant circuit (60) is switched with the capacity of the compressor (63) temporarily reduced. And, when the refrigeration cycle operation of the refrigerant circuit (60) is switched, the capacity control means (71) increases the once-reduced capacity of the compressor (63).

As described above, when the humidity controller apparatus (10) is in operation, moisture present in the air is adsorbed on the adsorbent of a heat exchanger (61, 62) which becomes an evaporator and moisture is desorbed out of the adsorbent of another heat exchanger (61, 62) which becomes a condenser. And, when approaching the point just before the occurrence of switching of the refrigeration cycle operation of the refrigerant circuit (60), the adsorbent will no longer adsorb moisture very much even when the heat exchanger (61, 62) which becomes an evaporator is continuously cooled and, in addition, moisture is no longer desorbed very much from the adsorbent even when the heat exchanger (61, 62) which becomes a condenser is continuously heated. That is to say, even if the compressor (63) is continuously operated at great capacity until the time just before switching of the refrigeration cycle operation of the refrigerant circuit (60), the effects of sufficiently increasing the amount of dehumidification from the first air stream and the amount of humidification to the second air stream are not expected any more.

To cope with the above, in the first constructional example of the capacity control means (71) in the sixth invention, the capacity control means (71) reduces the capacity of the compressor (63) in order to cut down, for example, electric power necessary for operating the compressor (63) at the stage slightly before switching of the operation of the refrigerant circuit (60) where the amount of dehumidification and the amount of humidification are already unlikely to increase. In addition, if the capacity of the compressor (63) decreases before switching of the operation of the refrigerant circuit (60), the capability to heat adsorbent and the capability to cool adsorbent are lowered proportionally. This makes it possible to reduce the time from when the refrigeration cycle operation of the refrigerant circuit (60) is switched to when the adsorbent reaches a temperature capable of allowing the adsorbent to effect sufficient moisture adsorption/desorption. As a result, the humidity control capability of the humidity controller apparatus (10) is improved.

A second constructional example of the capacity control means (71) in the sixth invention is a means which performs, every time the operation of the refrigerant circuit (60) is switched, a control operation of temporarily increasing the capacity of the compressor (63) above a reference capacity corresponding to the load of the humidity controller apparatus immediately after switching of the operation of the refrigerant circuit (60) and then decreasing the capacity of the compressor (63) after an elapse of a predetermined length of time since the switching of the operation of the refrigerant circuit (60).

In the second constructional example, the capacity control means (71) performs a predefined control operation every time the refrigeration cycle operation of the refrigerant circuit (60) is switched. In this control operation, the capacity control means (71) temporarily increases the capacity of the compressor (63) upon switching of the refrigeration cycle operation of the refrigerant circuit (60). At that time, the capacity control means (71) increases the capacity of the compressor (63) to exceed the reference capacity corresponding to the load of the humidity controller apparatus (10). Then, after an elapse of a predetermined length of time since the switching of the refrigeration cycle operation of the refrigerant circuit (60), the capacity control means (71) reduces the once-increased capacity of the compressor (63).

To sum up, in the second constructional example of the capacity control means (71) in the sixth invention, the capacity control means (71) temporarily increases the capacity of the compressor at the stage just after switching of the refrigeration cycle operation of the refrigerant circuit (60) where the adsorbents are required to be heated and cooled rapidly. Consequently, the temperature of the adsorbent in the heat exchanger (61, 62) which has converted into a condenser is increased rapidly, thereby making it possible to secure the amount of humidification to an air stream and, on the other hand, the temperature of the adsorbent in the heat exchanger (61, 62) which has converted into an evaporator is lowered rapidly, thereby making it possible to secure the amount of dehumidification from an air stream.

In the seventh invention, the expansion valve (65) which is variable in opening is provided to act as a refrigerant expansion mechanism in the refrigerant circuit (60). The opening of the expansion valve (65) is controlled by the opening control means (72). The opening control means (72) periodically increases and decreases the opening of the expansion valve (65). The cycle, at which the opening of the expansion valve (65) is varied by the opening control means (72), is the same as the cycle at which the refrigeration cycle operation of the refrigerant circuit (60) is switched. In other words, the refrigeration cycle operation of the refrigerant circuit (60).

As a specific constructional example of the opening control means (72) in the seventh invention, there are two examples as described below.

A first constructional example of the opening control means (72) in the seventh invention is a means which performs, every time the operation of the refrigerant circuit (60) is switched, a control operation of temporarily pre-increasing the opening of the expansion valve (65) prior to switching of the operation of the refrigerant circuit (60) and then decreasing the opening of the expansion valve (65) upon the switching of the operation of the refrigerant circuit (60).

In the first constructional example, the opening control means (72) performs a predefined control operation every time the refrigeration cycle operation of the refrigerant circuit (60) is switched. In this control operation, the opening control means (72) increases in advance the opening of the expansion valve (65) at the time of switching of the operation of the refrigerant circuit (60). To sum up, the refrigeration cycle operation of the refrigerant circuit (60) is switched with the opening of the expansion valve (65) temporarily increased. And, when the refrigeration cycle operation of the refrigerant circuit (60) is switched, the opening control means (72) reduces the once-increased opening of the expansion valve (65).

As described above, when approaching the point just before the occurrence of switching of the refrigeration cycle operation of the refrigerant circuit (60), the situation is that any increase in the amount of dehumidification and the amount of humidification is no longer expected. To cope with this, in such a state, the opening control means (72) operates to increase the opening of the expansion valve (65), in the first constructional example of the opening control means (72) in the seventh invention. As the opening of the expansion valve (65) increases, the high-low pressure difference in the refrigerant cycle is reduced, and the input to the compressor (63) which compresses refrigerants is reduced. Besides, when the opening of the expansion valve (65) increases prior to switching of the operation of the refrigerant circuit (60), the capability to heat adsorbent and the capability to cool adsorbent are lowered proportionally. This makes it possible to reduce the time from when the refrigeration cycle operation of the refrigerant circuit (60) is switched to when the adsorbent reaches a temperature capable of allowing the adsorbent to effect sufficient moisture adsorption/desorption. As a result, the humidity control capability of the humidity controller apparatus (10) is improved.

A second constructional example of the opening control means (72) in the seventh invention is a means which performs, every time the operation of the refrigerant circuit (60) is switched, a control operation of temporarily decreasing the opening of the expansion valve (65) below a reference opening corresponding to the operational status of the refrigerant circuit (60) immediately after switching of the operation of the refrigerant circuit (60) and then increasing the opening of the expansion valve (65) after an elapse of a predetermined length of time since the switching of the operation of the refrigerant circuit (60).

In the second constructional example, the opening control means (72) performs a predefined control operation every time the refrigeration cycle operation of the refrigerant circuit (60) is switched. In this control operation, the opening control means (72) temporarily decreases the opening of the expansion valve (65) upon switching of the refrigeration cycle operation of the refrigerant circuit (60). At that time, the opening control means (72) reduces the opening of the expansion valve (65) to fall below a reference opening corresponding to the operational status of the refrigerant circuit (60). Then, after an elapse of a predetermined length of time since the switching of the refrigeration cycle operation of the refrigerant circuit (60), the opening control means (72) expands the once-decreased opening of the expansion valve (65).

To sum up, in the second constructional example of the opening control means (72) in the seventh invention, the opening control means (72) temporarily reduces the opening of the expansion valve (65) at the stage just after switching of the refrigeration cycle operation of the refrigerant circuit (60) where the adsorbents are required to be heated and cooled rapidly. As the opening of the expansion valve (65) decreases, the high-low pressure difference in the refrigerant cycle increases, and the temperature of refrigerant condensation rises while the temperature of refrigerant evaporation drops. Consequently, the temperature of the adsorbent in the heat exchanger (61, 62) which has converted into a condenser is increased more rapidly, thereby making it possible to secure the amount of humidification to an air stream and, on the other hand, the temperature of the adsorbent in the heat exchanger (61, 62) which has converted into an evaporator is lowered more rapidly, thereby making it possible to secure the amount of dehumidification from an air stream.

EFFECTS

In the present invention, the humidity controller apparatus (10) is provided with the interval set means (74). The switching time interval, at which the first operation and the second operation are interswitched, is set depending on the load of the humidity controller apparatus (10). Therefore, in accordance with the present invention, it is possible to adequately set the capability to control the humidity exerted by the humidity controller apparatus (10) depending on the load of the humidity controller apparatus (10). In other words, it becomes possible to adjust the humidity control capability of the humidity controller apparatus (10) without an excess or deficiency depending on the latent heat load of a room. As a result, indoor comfort is improved to a further extent and, in addition, it is possible to aim at achieving energy savings by adequately adjusting the humidity control capability of the humidity controller apparatus.

In the second invention, the interval set means (74) reduces the switching time interval with the increase in the load of the humidity controller apparatus (10), in consideration of the characteristic of the humidity controller apparatus (10) which performs a so-called batch running operation, i.e., the characteristic that moisture adsorption/desorption for the adsorbent takes places intensively within a relatively short period of time after operational interswitching. Therefore, in accordance with the present invention, the humidity control capability of the humidity controller apparatus (10) can assuredly be adjusted by a simple technique, such as by adjustment in the switching interval time.

In the third invention, adsorption units are formed by the heat exchangers (61, 62) each supporting an adsorbent on its surface. Therefore, in the heat exchanger (61, 62) acting as an evaporator, heat of adsorption, generated when moisture is adsorbed on the adsorbent supported on the surface of the evaporator heat exchanger (61, 62), is absorbed by the refrigerant, thereby making it possible to increase the amount of moisture being adsorbed on the adsorbent. In addition, in the heat exchanger (61, 62) acting as a condenser, the adsorbent supported on the surface of the condenser heat exchanger (61, 62) is heated effectively by the refrigerant, thereby making it possible to increase the amount of moisture being desorbed from the adsorbent. Therefore, the present invention provides the humidity controller apparatus (10) whose humidity control capability is high.

In the fourth invention, in an operational status in which a second air stream taken into the humidity controller apparatus (10) has a higher temperature than a first air stream, the adsorbent of the heat exchanger (61, 62) converting into an evaporator from a condenser is precooled by the first air stream and the adsorbent of the heat exchanger (61, 62) converting into a condenser from an evaporator is preheated by the second air stream. In addition, in the fifth invention, in an operational status in which a first air stream taken into the humidity controller apparatus (10) has a higher temperature than a second air stream, the adsorbent of the heat exchanger (61, 62) converting into an evaporator from a condenser is precooled by both the refrigerant and the second air stream and the adsorbent of the heat exchanger (61, 62) converting into a condenser from an evaporator is preheated by both the refrigerant and the first air stream.

Therefore, in accordance with the fourth and fifth inventions, it is possible to reduce the time from when the refrigeration cycle operation of the refrigerant circuit (60) is switched to when the adsorbent reaches a temperature capable of allowing the adsorbent to effect sufficient moisture adsorption/desorption, and the amount of moisture being adsorbed by the adsorbent and the amount of moisture being desorbed from the adsorbent are increased. As a result, the humidity control capability of the humidity controller apparatus (10) is improved.

In the sixth invention, it is arranged that the capacity of the compressor (63) is adjusted in response to switching of the operation of the refrigerant circuit (60). In addition, in the seventh invention, it is arranged that the opening of the expansion valve (65) is adjusted in response to switching of the operation of the refrigerant circuit (60). Therefore, in accordance with these inventions, it becomes possible to control the capacity of the compressor (63) and the opening of the expansion valve (65) with accuracy, thereby making it possible to aim at accomplishing improvements in capability and efficiency of the humidity controller apparatus (10).

BRIEF DESCRIPTION OF DRAWINGS

FIG. 7A is a cross sectional view of the humidity controller apparatus showing the flow of air streams in a second operation of the ventilation and humidification mode, the view being taken along the line X-X of FIG. 7B;

FIG. 7B is a schematic top plan view of the humidity controller apparatus showing the flow of air streams in the second operation of the ventilation and humidification mode;

FIG. 7C is a cross sectional view of the humidity controller apparatus showing the flow of air streams in the second operation of the ventilation and humidification mode, the view being taken along the line Y-Y in FIG. 7B;

FIG. 8A is a cross sectional view of the humidity controller apparatus showing the flow of air streams in a first operation of a circulation and dehumidification mode, the view being taken along the line X-X in FIG. 8B;

FIG. 8B is a schematic top plan view of the humidity controller apparatus showing the flow of air streams in the first operation of the circulation and dehumidification mode;

FIG. 8C is a cross sectional view of the humidity controller apparatus showing the flow of air streams in the first operation of the circulation and dehumidification mode, the view being taken along the line Y-Y in FIG. 8B;

BEST MODE FOR CARRYING OUT INVENTION

Hereinafter, embodiments of the present invention will be described in detail with reference to the drawings.

Embodiment 1 of Invention

Figure 1A:
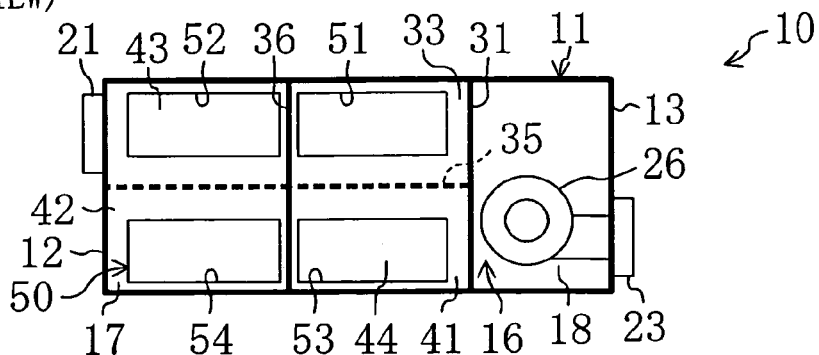
FIG. 1A is a schematic cross sectional view of a humidity controller apparatus of a first embodiment of the present invention, the view being taken along the line X-X in FIG. 1B.
Figure 1B:
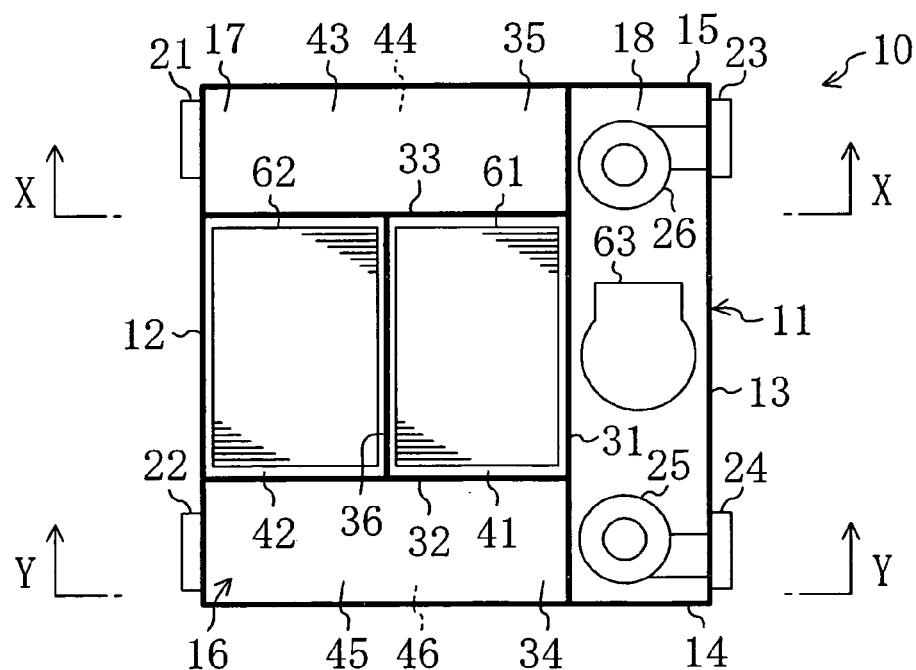
FIG. 1B is a schematic top plan view of the humidity controller apparatus of the first embodiment.
Figure 1C:
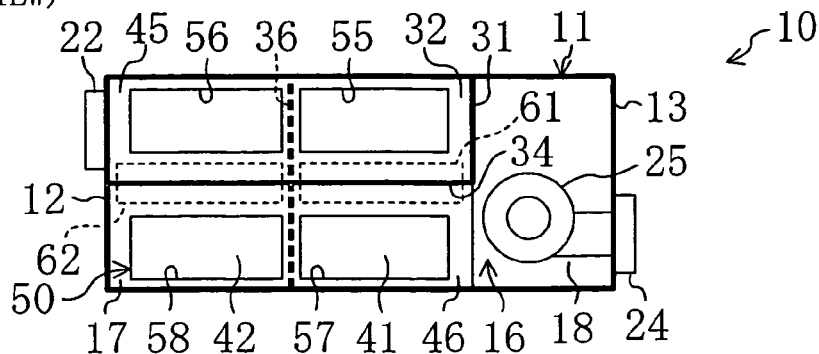
FIG. 1C is a schematic cross sectional view of the humidity controller apparatus of the first embodiment, the view being taken along the line Y-Y in FIG. 1B.

As shown in FIGS. 1A, 1B, and 1C, a humidity controller apparatus (10) of a first embodiment of the present invention operates to dehumidify and humidify air in an indoor space. The humidity controller apparatus (10) has a casing (11) shaped like a box. In FIG. 1B, the under side is a front side of the casing (11) and the upper side is a rear side of the casing (11). In the following description, "right" and "left" mean, respectively, "right" and "left" relative to the figure referred to.

The casing (11) contains therein a refrigerant circuit (60) and other components. The refrigerant circuit (60) is a closed circuit in which a first heat exchanger (61), a second heat exchanger (62), a compressor (63), a four-way selector valve (64), and an electric expansion valve (65) are provided. The refrigerant circuit (60) is filled up with a refrigerant. In the refrigerant circuit (60), a vapor compression refrigeration cycle is carried out by circulation of the filled refrigerant. The refrigerant circuit (60) will be described in detail later.

The casing (11) has approximately a square shape when viewed from above, and is shaped like a flat box. An outside air suction opening (21) is formed in a left side plate (12) of the casing (11), such that it is located adjacent to a rear plate (15) of the casing (11). Additionally, a room air suction opening (22) is formed in the left side plate (12), such that it is located adjacent to a front plate (14) of the casing (11). On the other hand, an exhaust air blowout opening (23) is formed in a right side plate (13) of the casing (11), such that it is located adjacent to the rear plate (15). Additionally, a supply air blowout opening (24) is formed in the right side plate (13), such that it is located adjacent to the front plate (14).

A first partition plate (31) is mounted within the casing (11), such that it stands nearer to the right side plate (13) than the center relative to the right-left direction. The first partition plate (31) divides an internal space (16) of the casing (11) into a left-hand side space and a right-hand side space. That is, a first space (17) is defined on the left side of the first partition plate (31) while, on the other hand, a second space (18) is defined on the right side of the first partition plate (31).

A compressor (63) of the refrigerant circuit (60) is disposed in the second space (18) of the casing (11). In addition, although not shown in FIGS. 1A-1C, the electric expansion valve (65) and the four-way selector valve (64) of the refrigerant circuit (60) are also disposed in the second space (18). Furthermore, an exhaust fan (26) and a supply fan (25) are accommodated in the second space (18). The exhaust fan (26) is connected to the exhaust air blowout opening (23). The supply fan (25) is connected to the supply air blowout opening (24).

A second partition plate (32), a third partition plate (33), and a sixth partition plate (36) are mounted in the first space (17) of the casing (11). The second partition plate (32) is mounted, such that it stands adjacent to the front plate (14). The third partition plate (33) is mounted, such that it stands adjacent to the rear plate (15). And, the first space (17) is divided by the second and third partition plates (32, 33) into three spaces in the direction from the front to the rear side. The sixth partition plate (36) is mounted in a space defined between the second partition plate (32) and the third partition plate (33). The sixth partition plate (36) is mounted, such that it stands centrally relative to the right-left width direction of the first space (17).

A space defined between the second partition plate (32) and the third partition plate (33) is divided by the sixth partition plate (36) into a right-hand space and a left-hand space. Of these spaces, the right-hand side space constitutes a first heat exchange chamber (41) in which is disposed the first heat exchanger (61). On the other hand, the left-hand side space constitutes a second heat exchange chamber (42) in which is disposed the second heat exchanger (62).

The heat exchangers (61, 62) are each shaped like a thick flat plate as a whole. And, the first heat exchanger (61) is disposed, such that it horizontally crosses the first heat exchange chamber (41). On the other hand, the second heat exchanger (62) is disposed, such that it horizontally crosses the second heat exchange chamber (42). The first and second heat exchangers (61, 62) will later be described in detail.

A fifth partition plate (35) is mounted in a space of the first space (17) sandwiched between the third partition plate (33) and the rear plate (15) of the casing (11). The fifth partition plate (35) is disposed, such that it crosses a heightwise middle region of the space. The fifth partition plate (35) vertically divides the space (see FIG. 1A). More specifically, a space defined on the upper side of the fifth partition plate (35) constitutes a first inflow path (43) while, on the other hand, a space defined on the lower side of the fifth partition plate (35) constitutes a first outflow path (44). The first inflow path (43) is in communication with the outside air suction opening (21). The first outflow path (44) is in communication with the exhaust air blowout opening (23) via the exhaust fan (26).

On the other hand, a fourth partition plate (34) is mounted in a space of the first space (17) defined between the second partition plate (32) and the front plate (14) of the casing (11). The fourth partition plate (34) is disposed, such that it crosses a heightwise middle region of the space. The fourth partition plate (34) vertically divides the space (see FIG. 1C). More specifically, a space defined on the upper side of the fourth partition plate (34) constitutes a second inflow path (45) while, on the other hand, a space defined on the lower side of the fourth partition plate (34) constitutes a second outflow path (46). The second inflow path (45) is in communication with the room air suction opening (22). The second outflow path (46) is in communication with the supply air blowout opening (24) via the supply fan (25).

Four openings (51, 52, 53, 54) are formed in the third partition plate (33) (see FIG. 1A). The first opening (51), located upper right of the third partition plate (33), establishes communication between the upper side of the first heat exchanger (61) in the first heat exchange chamber (41) and the first inflow path (43). The second opening (52), located upper left of the third partition plate (33), establishes communication between the upper side of the second heat exchanger (62) in the second heat exchange chamber (42) and the first inflow path (43). The third opening (53), located lower right of the third partition plate (33), establishes communication between the lower side of the first heat exchanger (61) in the first heat exchange chamber (41) and the first outflow path (44). The fourth opening (54), located lower left of the third partition plate (33), establishes communication between the lower side of the second heat exchanger (62) in the second heat exchange chamber (42) and the first outflow path (44).

Four openings (55, 56, 57, 58) are formed in the second partition plate (32) (see FIG. 1C). The fifth opening (55), located upper right of the second partition plate (32), establishes communication between the upper side of the first heat exchanger (61) in the first heat exchange chamber (41) and the second inflow path (45). The sixth opening (56), located upper left of the second partition plate (32), establishes communication between the upper side of the second heat exchanger (62) in the second heat exchange chamber (42) and the second inflow path (45). The seventh opening (57), located lower right of the second partition plate (32), establishes communication between the lower side of the first heat exchanger (61) in the first heat exchange chamber (41) and the second outflow path (46). The eighth opening (58), located lower left of the second partition plate (32), establishes communication between the lower side of the second heat exchanger (62) in the second heat exchange chamber (42) and the second outflow path (46).

Each opening (51, 52, 53, 54) of the third partition plate (33) is provided with a respective openable/closable damper. Likewise, each opening (55, 56, 57, 58) of the second partition plate (32) is provided with a respective openable/closable damper. Each opening (51, ..., 55, ...) is selectively placed in the open state or in the closed state by opening or closing its associated damper. And, the damper provided at each opening (51, ..., 55, ...) constitutes a switching mechanism (50) for switching of the distribution routes of first and second air streams in the casing (11).

Figure 2A:
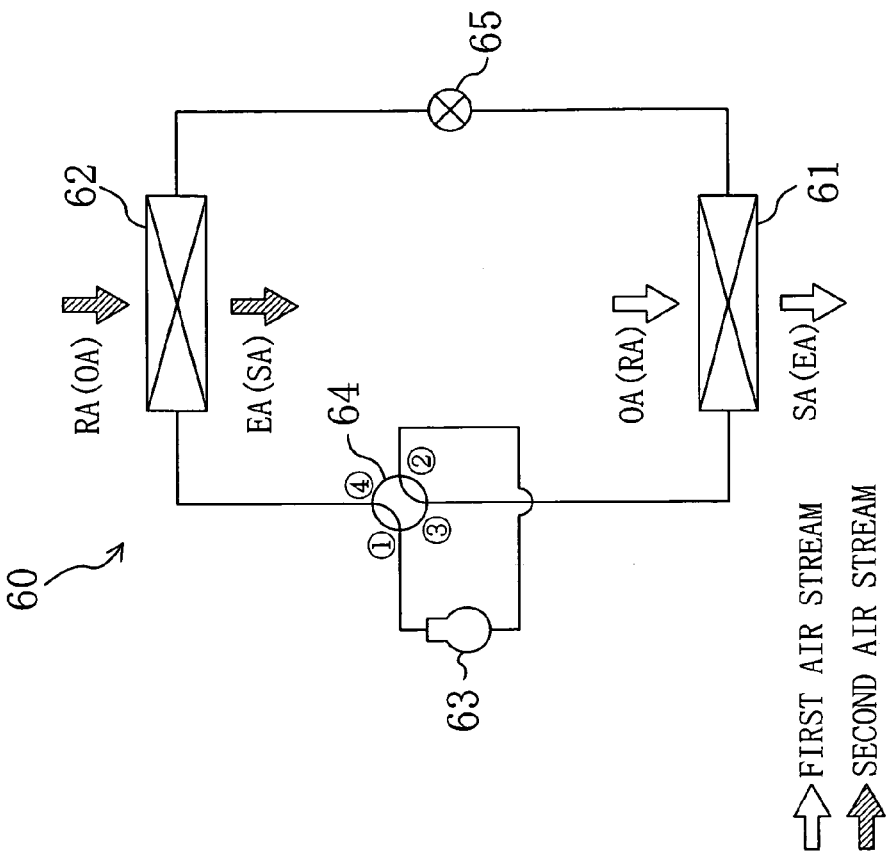
FIG. 2A is a refrigerant circuit diagram showing an arrangement of a refrigerant circuit and a first refrigeration cycle of the refrigerant circuit in the first embodiment.
Figure 2B:
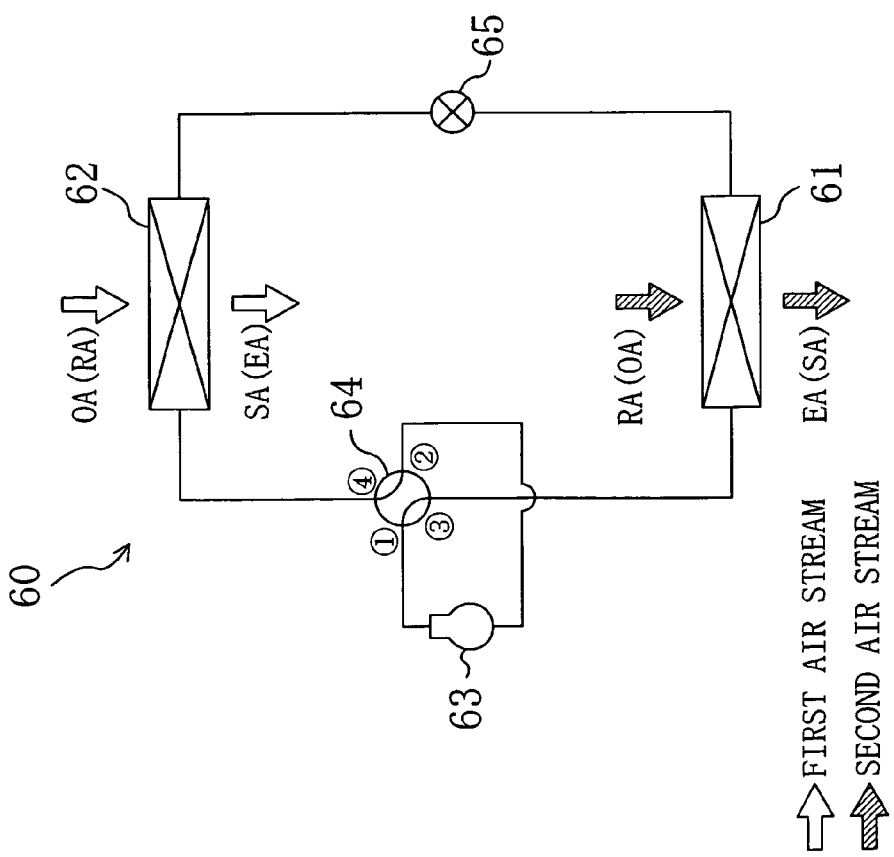
FIG. 2B is a refrigerant circuit diagram showing an arrangement of the refrigerant circuit and a second refrigeration cycle of the refrigerant circuit in the first embodiment.

With reference to FIG. 2A and FIG. 2B, the refrigerant circuit (60) is described below.

The discharge side of the compressor (63) is connected to a first port of the four-way selector valve (64). The suction side of the compressor (63) is connected to a second port of the four-way selector valve (64). One end of the first heat exchanger (61) is connected to a third port of the four-way selector valve (64). The other end of the first heat exchanger (61) is connected, through the electric expansion valve (65), to one end of the second heat exchanger (62). The other end of the second heat exchanger (62) is connected to a fourth port of the four-way selector valve (64).

The compressor (63) is a so-called hermetic compressor. Electric power is supplied, through an inverter, to an electric motor (not shown) of the compressor (63).

When the output frequency of the inverter is varied, the rotating speed of the electric motor likewise is varied. With such variation, the displacement volume of the compressor (63) varies. Stated another way, the compressor (63) is configured to be variable in capacity.

Each of the first and second heat exchangers (61, 62) is formed by a fin and tube heat exchanger of the so-called cross fin type having heat transfer pipes and a large number of fins. In addition, an adsorbent such as zeolite is supported approximately all over the external surface of each of the first and second heat exchangers (61, 62). And, the first heat exchanger (61) constitutes a first adsorption unit while, on the other hand, the second heat exchanger (62) constitutes a second adsorption unit.

The four-way selector valve (64) is configured, such that it selectably changes state to a first state that allows communication between the first port and the third port and communication between the second port and the fourth port (as indicated in FIG. 2A) or to a second state that allows communication between the first port and the fourth port and communication between the second port and the third port (as indicated in FIG. 2B). And, the refrigerant circuit (60) is configured, such that it selectively performs, by switching of the four-way selector valve (64), a first refrigeration cycle operation in which the first heat exchanger (61) functions as a condenser while, on the other hand, the second heat exchanger (62) functions as an evaporator or a second refrigeration cycle operation in which the first heat exchanger (61) functions as an evaporator while, on the other hand, the second heat exchanger (62) functions as a condenser.

Figure 3:
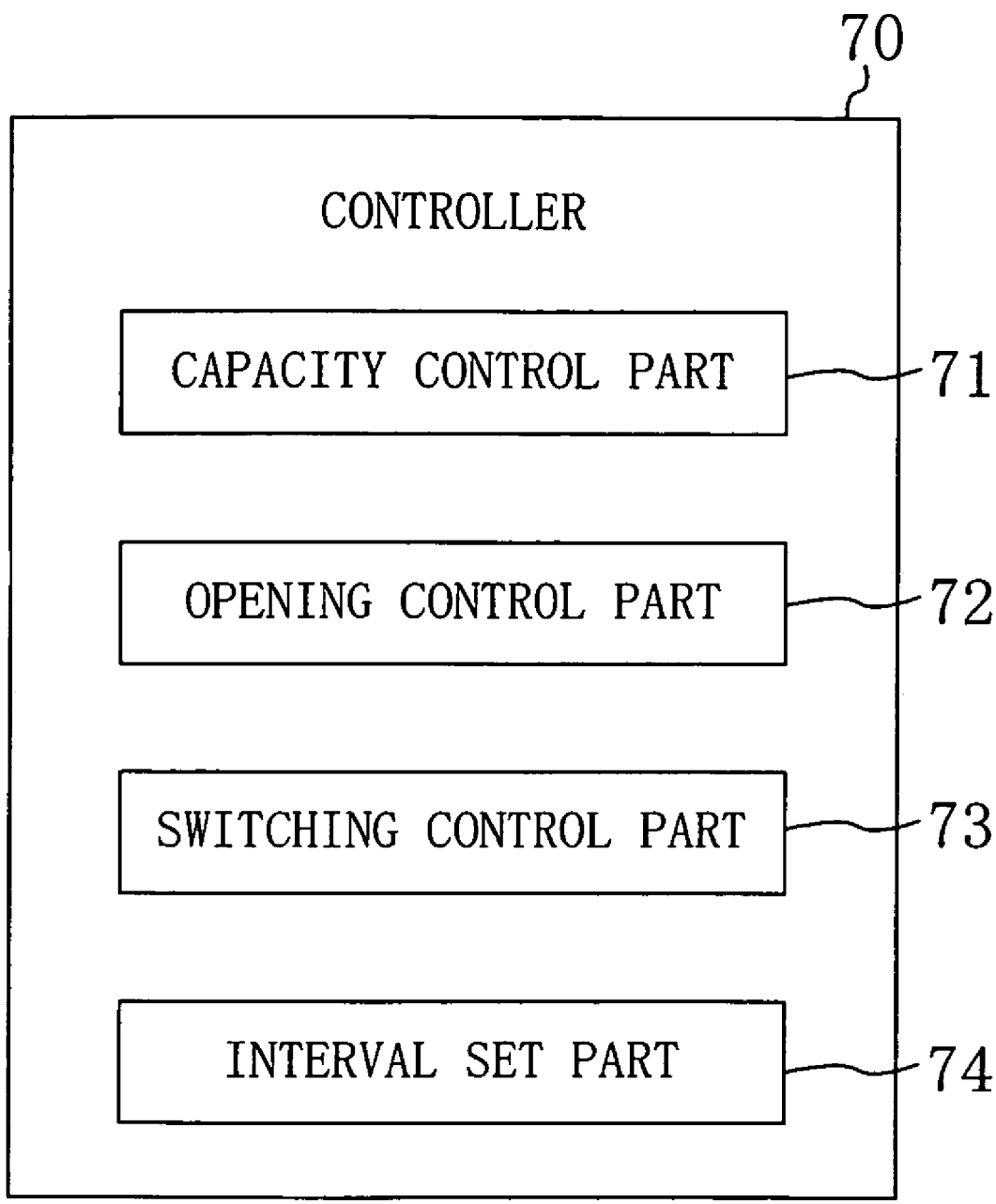
FIG. 3 is a block diagram showing an arrangement of a controller of the humidity controller apparatus in the first embodiment.

The humidity controller apparatus (10) is equipped with a controller (70). As shown in FIG. 3, the controller (70) includes a capacity control part (71), an opening control part (72), a switching control part (73), and an interval set part (74).

The capacity control part (71) is configured to control the capacity of the compressor (63). More specifically, the capacity control part (71) adjusts the capacity of the compressor (63) by adjusting the output frequency of the inverter. The capacity control part (71) adjusts the capacity of the compressor (63) depending on the operational status of the humidity controller apparatus (10).

The opening control part (72) is configured, such that it conducts control of the opening of the electric expansion valve (65). The opening control part (72) adjusts the opening of the electric expansion valve (65) depending on the operational status of the refrigerant circuit (60).

The switching control part (73) is configured, such that it conducts switching of the operation of the refrigerant circuit (60) simultaneously with switching of the distribution routes of the first and second air streams. More specifically, the switching control part (73) conducts the operation of the four-way selector valve (64) and the operation of the damper of each opening (51, ..., 55, ...) which constitutes a respective switching mechanism (50). In addition, the switching control part (73) periodically controls the operation of the four-way selector valve (64) and the operation of the switching mechanism (50) at a predetermined switching time interval.

The interval set part (74) is configured, such that it sets the switching time interval. In other words, the time interval, at which the switching control part (73) operates the four-way selector valve (64) and the switching mechanism (50), is set by the interval set part (74). In addition, the interval set part (74) constitutes an interval set means which sets a switching time interval depending on the load of the humidity controller apparatus (10).

Humidity Control Operation of Humidity Controller Apparatus

The humidity control operation of the humidity controller operation (10) is described. The operation of the humidity controller operation (10) is switchable between a ventilation/dehumidification mode, a ventilation/humidification mode, a circulation/dehumidification mode, and a circulation/humidification mode. In addition, in the humidity controller apparatus (10), a first operation and a second operation are alternately repeatedly performed at a predetermined time interval during each mode.

Ventilation/Dehumidification Mode

In the ventilation/dehumidification mode, the supply fan (25) and the exhaust fan (26) are operated in the humidity controller apparatus (10). And, the humidity controller apparatus (10) takes in outside air (OA) as a first air stream and supplies it into a room while taking in room air (RA) as a second air stream and discharging it to outside the room.

In the first place, a first operation of the ventilation/dehumidification mode is described with reference to FIGS. 2A and 2B and FIGS. 4A-4C. In the first operation, adsorbent regeneration takes place in the first heat exchanger (61) while, on the other hand, dehumidification of outside air (OA) as a first air stream takes place in the second heat exchanger (62).

In the first operation, in the refrigerant circuit (60) the four-way selector valve (64) changes state to a state as shown in FIG. 2A. In this state, when the compressor (63) is operated, the refrigerant circulates in the refrigerant circuit (60), and a first refrigeration cycle operation is carried out in which the first heat exchanger (61) and the second heat exchanger (62) act as a condenser and as an evaporator, respectively.

More specifically, the refrigerant discharged out of the compressor (63) gives off the heat and condenses in the first heat exchanger (61). Thereafter, the refrigerant is delivered to the electric expansion valve (65) and is reduced in pressure. The pressure-reduced refrigerant absorbs heat and evaporates in the second heat exchanger (62). Thereafter, the refrigerant is drawn into the compressor (63) and is compressed. Then, the compressed refrigerant is again discharged out of the compressor (63).

Figure 4A:
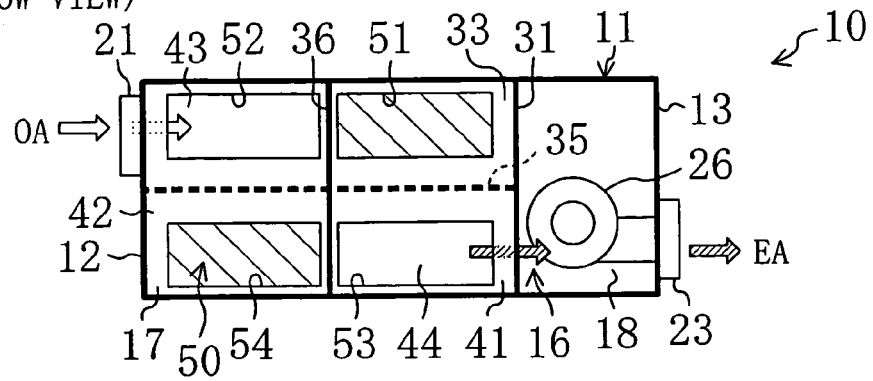
FIG. 4A is a cross sectional view of the humidity controller apparatus showing the flow of air streams in a first operation of a ventilation and dehumidification mode, the view being taken along the line X-X in FIG. 4B.
Figure 4B:
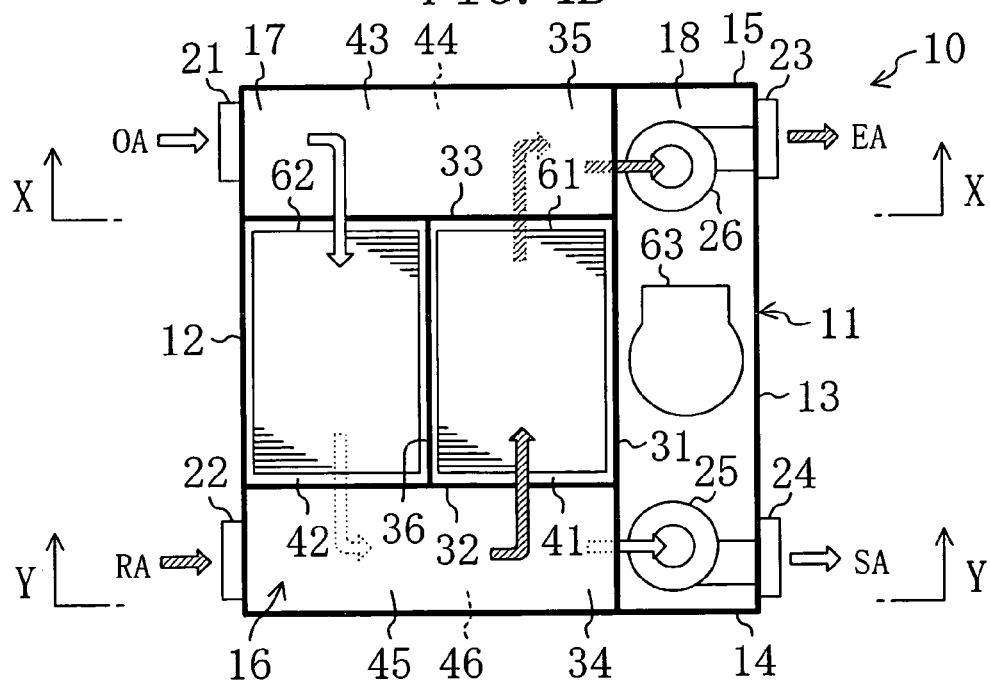
FIG. 4B is a schematic top plan view of the humidity controller apparatus showing the flow of air streams in the first operation of the ventilation and dehumidification mode.
Figure 4C:
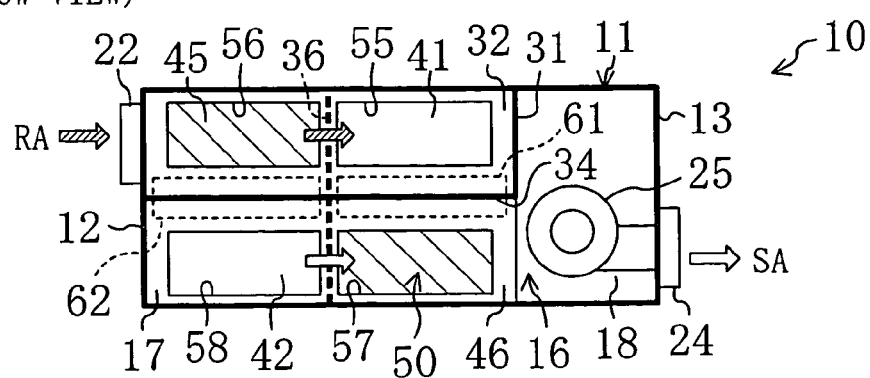
FIG. 4C is a cross sectional view of the humidity controller apparatus showing the flow of air streams in the first operation of the ventilation and dehumidification mode, the view being taken along the line Y-Y in FIG. 4B.

In addition, in the first operation, the damper of each opening (51, . . . , 55, . . . ) which constitutes a respective switching mechanism (50) is set in a first distribution state of the ventilation/dehumidification mode. In this state, the second opening (52), the third opening (53), the fifth opening (55), and the eighth opening (58) enter the open state while, on the other hand, the first opening (51), the fourth opening (54), the sixth opening (56), and the seventh opening (57) enter the closed state. Consequently, as shown in FIGS. 4A-4C, room air (RA) as a second air stream is supplied to the first heat exchanger (61) while, on the other hand, outside air (OA) as a first air stream is supplied to the second heat exchanger (62).

More specifically, the second air stream entered from the room air suction opening (22) is delivered, through the second inflow path (45) and then through the fifth opening (55), to the first heat exchange chamber (41). In the first heat exchange chamber (41), the second air stream passes from up to down through the first heat exchanger (61). In the first heat exchanger (61), the adsorbent supported on the external surface is heated by the refrigerant, and moisture desorption from the adsorbent takes place. The desorbed moisture from the adsorbent is given to the second air stream passing through the first heat exchanger (61). The second air stream moisturized in the first heat exchanger (61) flows out, through the first heat exchange chamber (41) and then through the third opening (53), to the first outflow path (44). Thereafter, the second air stream is drawn into the exhaust fan (26) and is discharged to outside the room from the exhaust air blowout opening (23) as exhaust air (EA).

Meanwhile, the first air stream entered from the outside air suction opening (21) is delivered, through the first inflow path (43) and then through the second opening (52), to the second heat exchange chamber (42). In the second heat exchange chamber (42), the first air stream passes from up to down through the second heat exchanger (62). In the second heat exchanger (62), moisture present in the first air stream is adsorbed on the adsorbent supported on the surface of the second heat exchanger (62), and resulting heat of adsorption is absorbed by the refrigerant. The first air stream dehumidified in the second heat exchanger (62) flows out, through the second heat exchange chamber (42) and then through the eighth opening (58), to the second outflow path (46). Thereafter, the first air stream is drawn into the supply fan (25) and is supplied into the room from the supply air blowout opening (24) as supply air (SA).

Next, a second operation of the ventilation/dehumidification mode is described with reference to FIGS. 2A and 2B and FIGS. 5A-5C. In the second operation, adsorbent regeneration takes place in the second heat exchanger (62) while, on the other hand, dehumidification of outside air (OA) as a first air stream takes place in the first heat exchanger (61).

In the second operation, in the refrigerant circuit (60) the four-way selector valve (64) changes state to a state as shown in FIG. 2B. In this state, when the compressor (63) is operated, the refrigerant circulates in the refrigerant circuit (60), and a second refrigeration cycle operation is carried out in which the first heat exchanger (61) and the second heat exchanger (62) act as an evaporator and as a condenser, respectively.

More specifically, the refrigerant discharged out of the compressor (63) gives off the heat and condenses in the second heat exchanger (62). Thereafter, the refrigerant is delivered to the electric expansion valve (65) and is reduced in pressure. The pressure-reduced refrigerant absorbs heat and evaporates in the first heat exchanger (61). Thereafter, the refrigerant is drawn into the compressor (63) and is compressed. Then, the compressed refrigerant is again discharged out of the compressor (63).

Figure 5A:
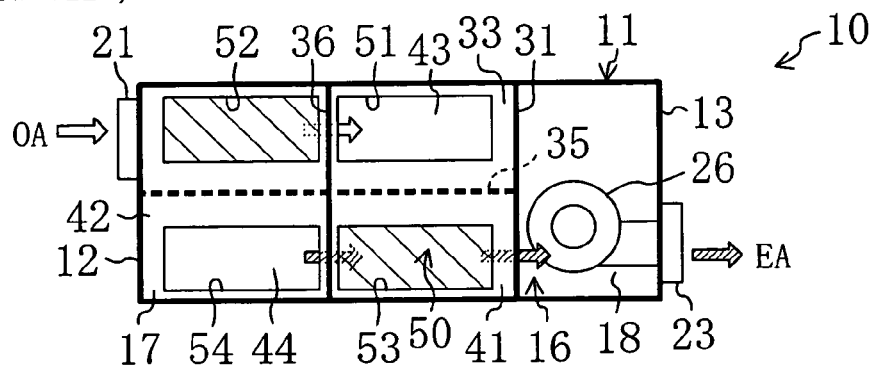
FIG. 5A is a cross sectional view of the humidity controller apparatus showing the flow of air streams in a second operation of the ventilation and dehumidification mode, the view being taken along the line X-X in FIG. 5B.
Figure 5B:
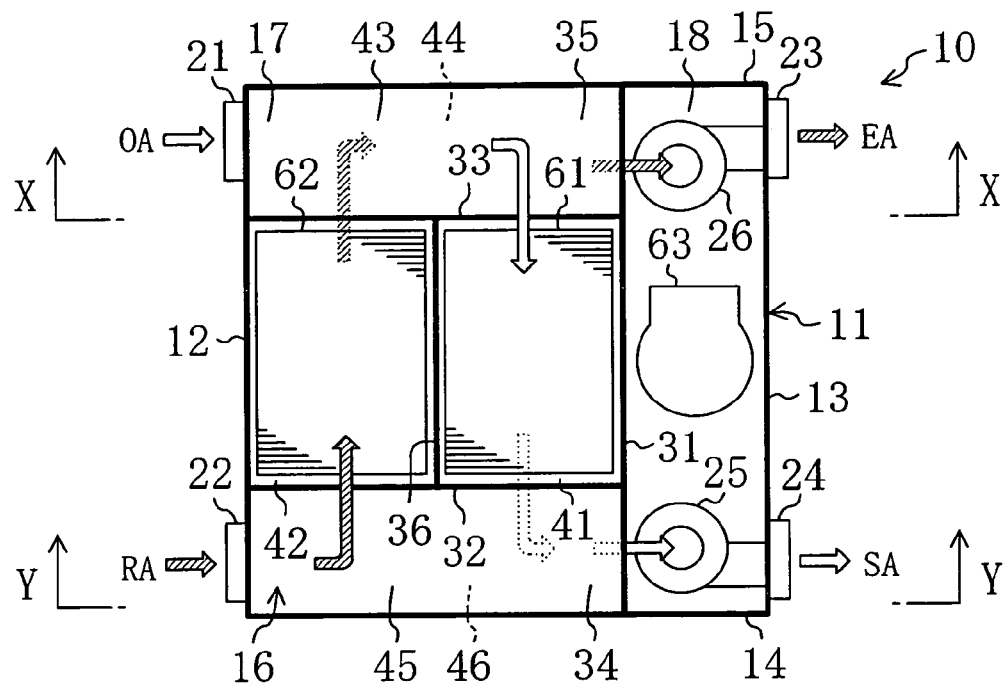
FIG. 5B is a schematic top plan view of the humidity controller apparatus showing the flow of air streams in the second operation of the ventilation and dehumidification mode.
Figure 5C:
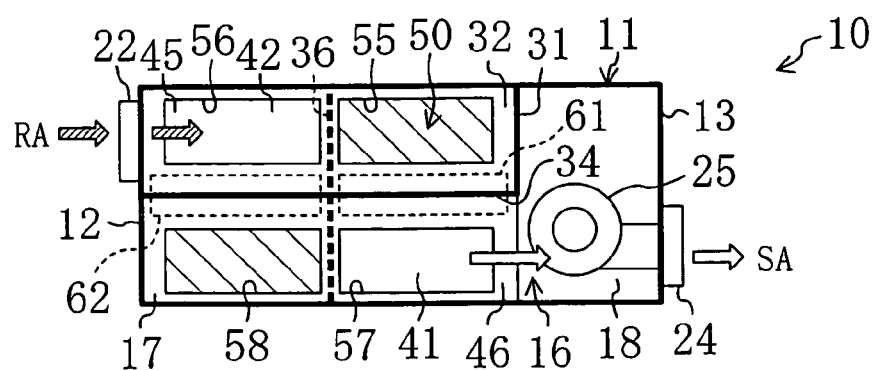
FIG. 5C is a cross sectional view of the humidity controller apparatus showing the flow of air streams in the second operation of the ventilation and dehumidification mode, the view being taken along the line Y-Y in FIG. 5B.

In addition, in the second operation, the damper of each opening (51, . . . , 55, . . . ) which constitutes a respective switching mechanism (50) is set in a second distribution state of the ventilation/dehumidification mode. In this state, the first opening (51), the fourth opening (54), the sixth opening (56), and the seventh opening (57) enter the open state while, on the other hand, the second opening (52), the third opening (53), the fifth opening (55), and the eighth opening (58) enter the closed state. Consequently, as shown in FIGS. 5A-5C, outside air (OA) as a first air stream is supplied to the first heat exchanger (61) while, on the other hand, room air (RA) as a second air stream is supplied to the second heat exchanger (62).

More specifically, the second air stream entered from the room air suction opening (22) is delivered, through the second inflow path (45) and then through the sixth opening (56), to the second heat exchange chamber (42). In the second heat exchange chamber (42), the second air passes from up to down through the second heat exchanger (62). In the second heat exchanger (62), the adsorbent supported on the external surface is heated by the refrigerant, and moisture desorption from the adsorbent takes place. The moisture desorbed from the adsorbent is given to the second air stream passing through the second heat exchanger (62). The second air stream moisturized in the second heat exchanger (62) flows out, through the second heat exchange chamber (42) and then through the fourth opening (54), to the first outflow path (44). Thereafter, the second air stream is drawn into the exhaust fan (26) and is discharged to outside the room from the exhaust air blowout opening (23) as exhaust air (EA).

Meanwhile, the first air stream entered from the outside air suction opening (21) is delivered, through the first inflow path (43) and then through the first opening (51), to the first heat exchange chamber (41). In the first heat exchange chamber (41), the first air stream passes from up to down through the first heat exchanger (61). In the first heat exchanger (61), moisture present in the first air stream is adsorbed by the adsorbent supported on the surface of the first heat exchanger (61), and resulting heat of adsorption is absorbed by the refrigerant. The first air-stream dehumidified in the first heat exchanger (61) flows out, through the first heat exchange chamber (41) and then through the seventh opening (57), to the second outflow path (46). Thereafter, the first air stream is drawn into the supply fan (25) and is supplied into the room from the supply air blowout opening (24) as supply air (SA).

Ventilation/Humidification Mode

In the ventilation/humidification mode, the supply fan (25) and the exhaust fan (26) are operated in the humidity controller apparatus (10). And, the humidity controller apparatus (10) takes in room air (RA) as a first air stream and discharges it to outside the room while, on the other hand, taking in outside air (OA) as a second air stream and supplying it into the room.

In the first place, a first operation in the ventilation/humidification mode is described with reference to FIGS. 2A and 2B and FIGS. 6A-6C. In the first operation, humidification of outside air (OA) as a second air stream takes place in the first heat exchanger (61) while, on the other hand, recovery of moisture from room air (RA) as a first air stream takes place in the second heat exchanger (62).

In the first operation, in the refrigerant circuit (60) the four-way selector valve (64) changes state to a state as shown in FIG. 2A. In this state, when the compressor (63) is operated, the refrigerant circulates in the refrigerant circuit (60), and a first refrigeration cycle operation is carried out in which the first heat exchanger (61) and the second heat exchanger (62) act as a condenser and as an evaporator, respectively.

Figure 6A:
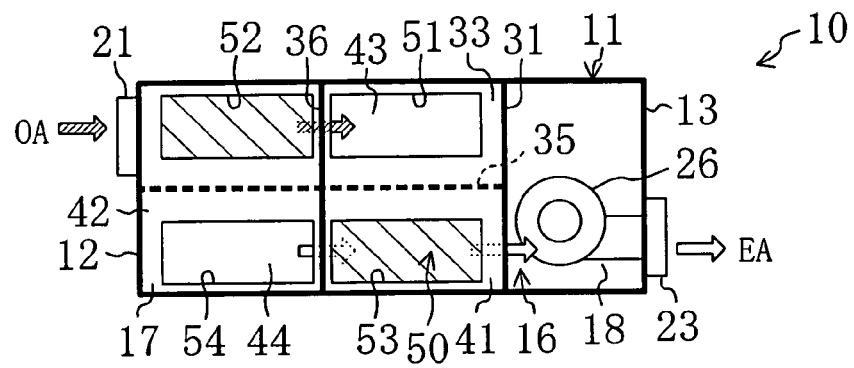
FIG. 6A is a cross sectional view of the humidity controller apparatus showing the flow of air streams in a first operation of a ventilation and humidification mode, the view being taken along the line X-X in FIG. 6B.
Figure 6B:
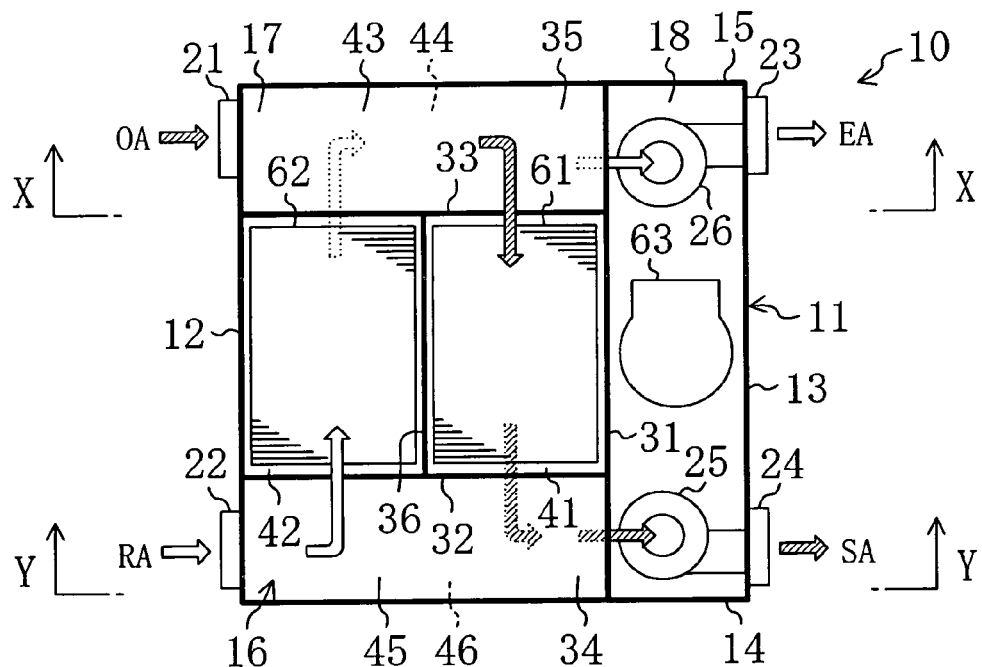
FIG. 6B is a schematic top plan view of the humidity controller apparatus showing the flow of air streams in the first operation of the ventilation and humidification mode.
Figure 6C:
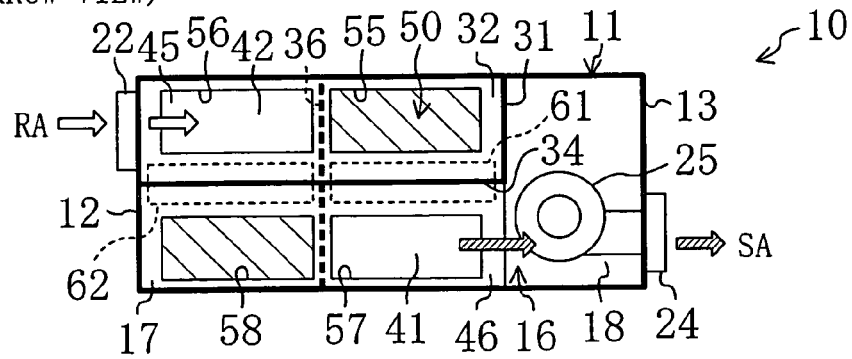
FIG. 6C is a cross sectional view of the humidity controller apparatus showing the flow of air streams in the first operation of the ventilation and humidification mode, the view being taken along the line Y-Y in FIG. 6B.

In addition, in the first operation, the damper of each opening (51, . . . , 55, . . . ) which constitutes a respective switching mechanism (50) is set in a first distribution state of the ventilation/humidification mode. In this state, the first opening (51), the fourth opening (54), the sixth opening (56), and the seventh opening (57) enter the open state while, on the other hand, the second opening (52), the third opening (53), the fifth opening (55), and the eighth opening (58) enter the closed state. Consequently, as shown in FIGS. 6A-6C, outside air (OA) as a second air stream is supplied to the first heat exchanger (61) while, on the other hand, room air (RA) as a first air stream is supplied to the second heat exchanger (62).

More specifically, the first air stream entered from the room air suction opening (22) is delivered, through the second inflow path (45) and then through the sixth opening (56), to the second heat exchange chamber (42). In the second heat exchange chamber (42), the first air stream passes from up to down through the second heat exchanger (62). In the second heat exchanger (62), moisture present in the first air stream is adsorbed on the adsorbent supported on the surface of the second heat exchanger (62), and resulting heat of adsorption is absorbed by the refrigerant. Thereafter, the moisture-removed first air stream passes through the fourth opening (54), the first outflow path (44), and the exhaust fan (26) in that order, and is discharged to outside the room from the exhaust air blowout opening (23) as exhaust air (EA).

Meanwhile, the second air stream entered from the outside air suction opening (21) is delivered, through the first inflow path (43) and then through the first opening (51), to the first heat exchange chamber (41). In the first heat exchange chamber (41), the second air stream passes from up to down through the first heat exchanger (61). In the first heat exchanger (61), the adsorbent supported on the external surface is heated by the refrigerant, and moisture desorption from the adsorbent takes place. The moisture desorbed from the adsorbent is given to the second air stream passing through the first heat exchanger (61). Thereafter, the second air stream thus humidified passes through the seventh opening (57), the second outflow path (46), and the supply fan (25) in that order, and is supplied into the room from the supply air blowout opening (24) as supply air (SA).

Next, a second operation of the ventilation/humidification mode is described with reference to FIGS. 2A and 2B and FIGS. 7A-7C. In the second operation, humidification of outside air (OA) as a second air stream takes place in the second heat exchanger (62) while, on the other hand, recovery of moisture from room air (RA) as a first air stream takes place in the first heat exchanger (61).

In the second operation, in the refrigerant circuit (60) the four-way selector valve (64) changes state to a state as shown in FIG. 2B. In this state, when the compressor (63) is operated, the refrigerant circulates in the refrigerant circuit (60), and a second refrigeration cycle operation is carried out in which the first heat exchanger (61) and the second heat exchanger (62) act, respectively, as an evaporator and as a condenser.

In addition, in the second operation, the damper of each opening (51, . . . , 55, . . . ) which constitutes a respective switching mechanism (50) is set in a second distribution state of the ventilation/humidification mode. In this state, the second opening (52), the third opening (53), the fifth opening (55), and the eighth opening (58) enter the open state while, on the other hand, the first opening (51), the fourth opening (54), the sixth opening (56), and the seventh opening (57) enter the closed state. Consequently, as shown in FIGS. 7A-7C, room air (RA) as a first air stream is supplied to the first heat exchanger (61) while, on the other hand, outside air (OA) as a second air stream is supplied to the second heat exchanger (62).

More specifically, the first air stream entered from the room air suction opening (22) is delivered, through the second inflow path (45) and then through the fifth opening (55), to the first heat exchange chamber (41). In the first heat exchange chamber (41), the first air stream passes from up to down through the first heat exchanger (61). In the first heat exchanger (61), moisture present in the first air stream is adsorbed on the adsorbent supported on the surface of the first heat exchanger (61), and resulting heat of adsorption is absorbed by the refrigerant. Thereafter, the moisture-removed first air stream passes through the third opening (53), the first outflow path (44), and the exhaust fan (26) in that order, and is discharged from the exhaust air blowout opening (23) to outside the room as exhaust air (EA).

Meanwhile, the second air stream entered from the outside air suction opening (21) is delivered, through the first inflow path (43) and then through the second opening (52), to the second heat exchange chamber (42). In the second heat exchange chamber (42), the second air stream passes from up to down through the second heat exchanger (62). In the second heat exchanger (62), the adsorbent supported on the external surface is heated by the refrigerant and, as a result, moisture desorption from the adsorbent takes place. The moisture desorbed from the adsorbent is given to the second air stream passing through the second heat exchanger (62). Thereafter, the second air stream thus humidified passes through the eighth opening (58), the second outflow path (46), and the supply fan (25) in that order, and is supplied, as supply air (SA), from the supply air blowout opening (24) into the room.

Circulation/Dehumidification Mode

In the circulation/dehumidification mode, the supply fan (25) and the exhaust fan (26) are operated in the humidity controller apparatus (10). And, the humidity controller apparatus (10) takes in room air (RA) as a first air stream and then sends it back into the room after dehumidification while, on the other hand, the humidity controller apparatus (10) takes in outside air (OA) as a second air stream and then discharges it outside the room, together with moisture desorbed from the adsorbent.

In the first place, a first operation of the circulation/dehumidification mode is described with reference to FIGS. 2A and 2B and FIGS. 8A-8C. In the first operation, adsorbent regeneration takes place in the first heat exchanger (61) while, on the other hand, dehumidification of room air (RA) as a first air stream takes place in the second heat exchanger (62).

In the first operation, in the refrigerant circuit (60) the four-way selector valve (64) changes state to a state as shown in FIG. 2A, and a first refrigeration cycle operation is carried out. In addition, the damper of each opening (51, ... , 55, ... ) which constitutes a respective switching mechanism (50) is set in a first distribution state of the circulation/dehumidification mode. In this state, the first opening (51), the third opening (53), the sixth opening (56), and the eighth opening (58) enter the open state while, on the other hand, the second opening (52), the fourth opening (54), the fifth opening (55), and the seventh opening (57) enter the closed state. Consequently, as shown in FIGS. 8A-8C, outside air (OA) as a second air stream is supplied to the first heat exchanger (61) while, on the other hand, room air (RA) as a first air stream is supplied to the second heat exchanger (62).

More specifically, after flowing in from the outside air suction opening (21), the second air stream is introduced into the first heat exchange chamber (41) and passes through the first heat exchanger (61). In the first heat exchanger (61), the adsorbent supported on the external surface is heated by the refrigerant, as a result of which the adsorbent is regenerated. And, the second air stream which was given moisture desorbed from the adsorbent is discharged to outside the room from the exhaust air blowout opening (23) as exhaust air (EA).

Meanwhile, after flowing in from the room air suction opening (22), the first air stream is introduced into the second heat exchange chamber (42) and passes through the second heat exchanger (62). In the second heat exchanger (62), moisture present in the first air stream is adsorbed on the adsorbent supported on the surface of the second heat exchanger (62). Resulting heat of adsorption is absorbed by the refrigerant. And, the first air stream dehumidified in the second heat exchanger (61) is supplied into the room from the supply air blowout opening (24) as supply air (SA).

Next, a second operation of the circulation/dehumidification mode is described with reference to FIGS. 2A and 2B and FIGS. 9A-9C. In the second operation, regeneration of adsorbent takes place in the second heat exchanger (62) while, on the other hand, dehumidification of room air (RA) as a first air stream takes place in the first heat exchanger (61).

Figure 9A:
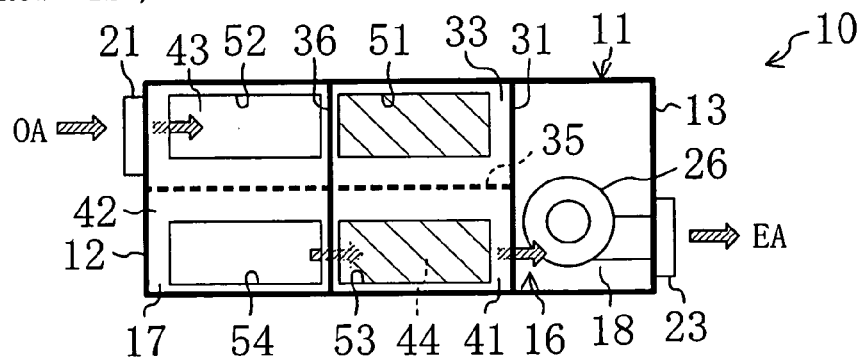
FIG. 9A is a cross sectional view of the humidity controller apparatus showing the flow of air streams in a second operation of the circulation and dehumidification mode, the view being taken along the line X-X in FIG. 9B.
Figure 9B:
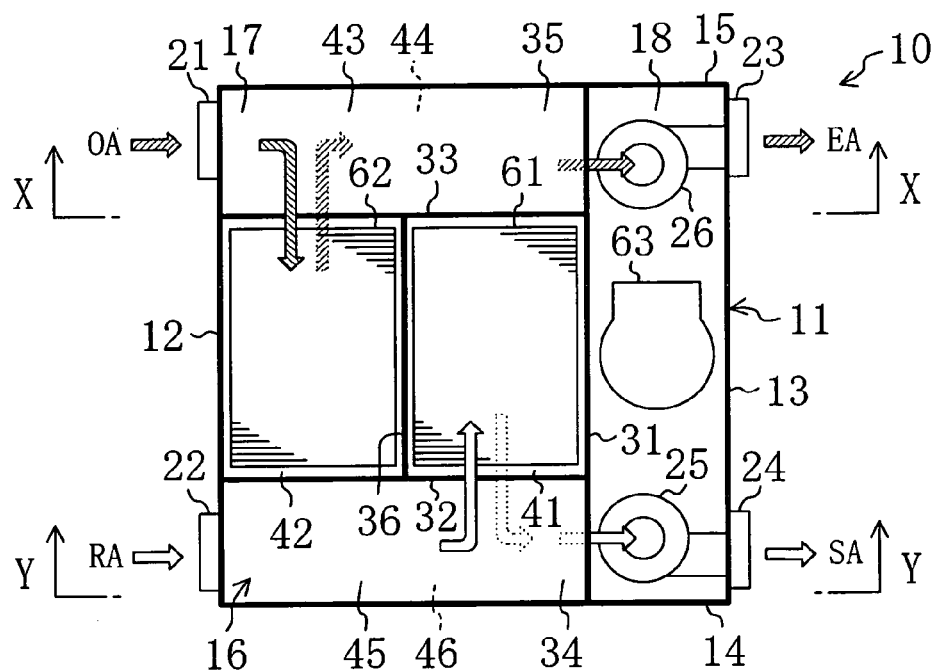
FIG. 9B is a schematic top plan view of the humidity controller apparatus showing the flow of air streams in the second operation of the circulation and dehumidification mode.
Figure 9C:
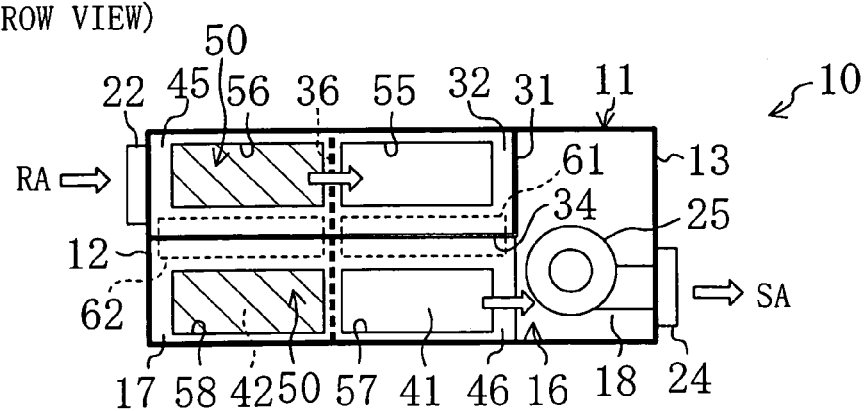
FIG. 9C is a cross sectional view of the humidity controller apparatus showing the flow of air streams in the second operation of the circulation and dehumidification mode, the view being taken along the line Y-Y in FIG. 9B.

In the second operation, in the refrigerant circuit (60) the four-way selector valve (64) changes state to a state as shown in FIG. 2B, and a second refrigeration cycle operation is carried out. In addition, the damper of each opening (51, ... , 55, ... ) which constitutes a respective switching mechanism (50) is set in a second distribution state of the circulation/dehumidification mode. In this state, the second opening (52), the fourth opening (54), the fifth opening (55), and the seventh opening (57) enter the open state. On the other hand, the first opening (51), the third opening (53), the sixth opening (56), and the eighth opening (58) enter the closed state. Consequently, as shown in FIGS. 9A-9C, room air (RA) as a first air stream is supplied to the first heat exchanger (61) while, on the other hand, outside air (OA) as a second air stream is supplied to the second heat exchanger (62).

More specifically, after flowing in from the outside air suction opening (21), the second air stream is introduced into the second heat exchange chamber (42) and passes through the second heat exchange chamber (42). In the second heat exchanger (62), the adsorbent supported on the external surface is heated by the refrigerant, as a result of which the adsorbent is regenerated. And, the second air stream which was given moisture desorbed from the adsorbent is discharged to outside the room from the exhaust air blowout opening (23) as exhaust air (EA).

Meanwhile, after flowing in from the room air suction opening (22), the first air stream is introduced into the first heat exchange chamber (41) and passes through the first heat exchanger (61). In the first heat exchanger (61), moisture present in the first air stream is adsorbed on the adsorbent supported on the external surface of the first heat exchanger (61). Resulting heat of adsorption is absorbed by the refrigerant. And, the first air stream dehumidified in the first heat exchanger (61) is supplied into the room from the supply air blowout opening (24) as supply air (SA).

Circulation/Humidification Mode

In the circulation/humidification mode, the supply fan (25) and the exhaust fan (26) are operated in the humidity controller apparatus (10). And, the humidity controller apparatus (10) takes in outdoor air (OA) as a first air stream and then discharges it to outside the room after moisture removal while, on the other hand, the humidity controller apparatus (10) takes in room air (RA) as a second air stream and then sends it back into the room after dehumidification.

In the first place, a first operation of the circulation/humidification mode is described with reference to FIGS. 2A and 2B and FIGS. 10A-10C. In the first operation, humidification of room air (RA) as a second air stream takes place in the first heat exchanger (61) and recovery of moisture from outside air (OA) as a first air stream takes place in the second heat exchanger (62).

Figure 10A:
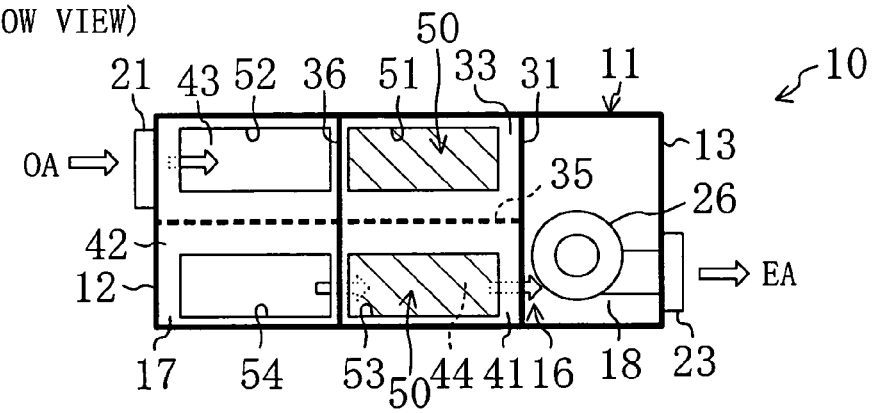
FIG. 10A is a cross sectional view of the humidity controller apparatus showing the flow of air streams in a first operation of a circulation and humidification mode, the view being taken along the line X-X in FIG. 10B.
Figure 10B:
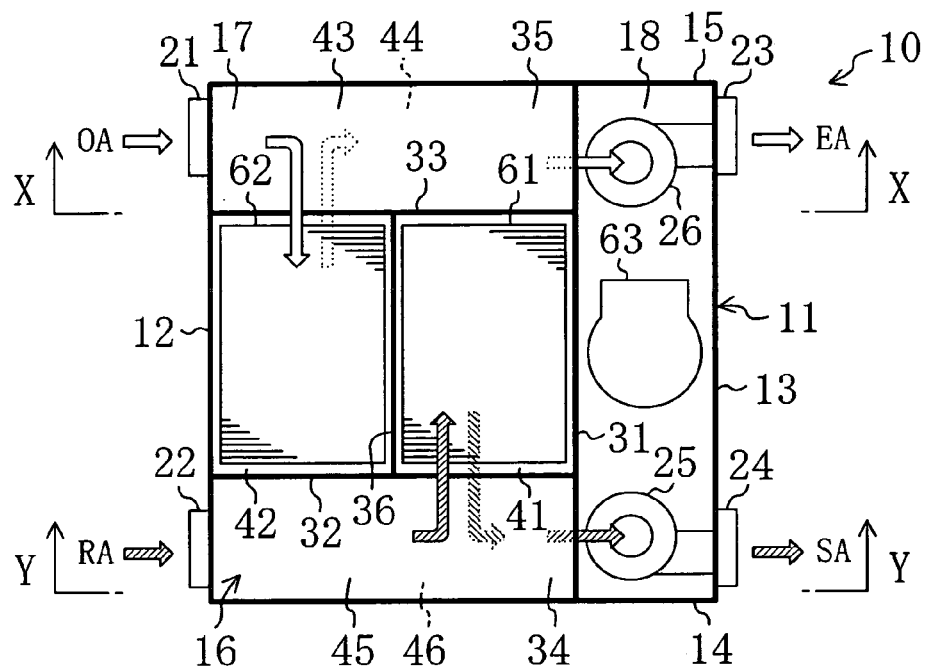
FIG. 10B is a schematic top plan view of the humidity controller apparatus showing the flow of air streams in the first operation of the circulation and humidification mode.
Figure 10C:
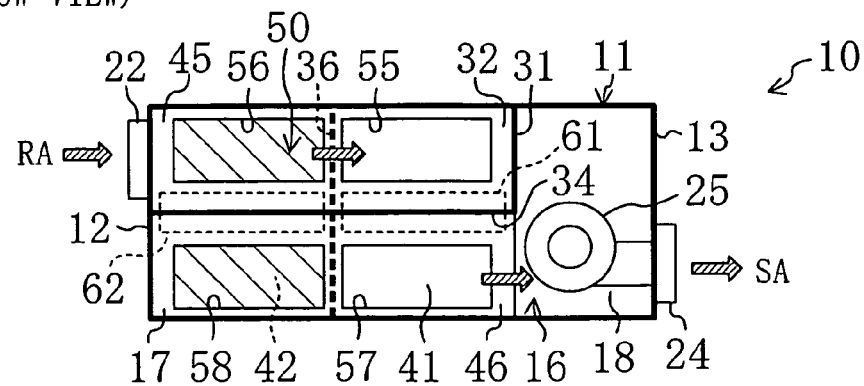
FIG. 10C is a cross sectional view of the humidity controller apparatus showing the flow of air streams in the first operation of the circulation and humidification mode, the view being taken along the line Y-Y in FIG. 10B.

In the first operation, in the refrigerant circuit (60) the four-way selector valve (64) changes state to a state as shown in FIG. 2A, and a first refrigeration cycle operation is carried out. In addition, the damper of each opening (51, ... , 55, ... ) which constitutes a respective switching mechanism (50) is set in a first distribution state of the circulation/humidification mode. In this state, the second opening (52), the fourth opening (52), the fifth opening (55), and the seventh opening (57) enter the open state. On the other hand, the first opening (51), the third opening (53), the sixth opening (56), and the eighth opening (58) enter the closed state. Consequently, as shown in FIGS. 10A-10C, room air (RA) as a second air stream is supplied to the first heat exchanger (61) while, on the other hand, outside air (OA) as a first air stream is supplied to the second heat exchanger (62).

More specifically, after flowing in from the outside air suction opening (21), the first air stream is introduced into the second heat exchange chamber (42) and passes through the second heat exchanger (62). In the second heat exchanger (62), moisture present in the first air stream is adsorbed on the adsorbent supported on the surface of the second heat exchanger (62), and resulting heat of adsorption is absorbed by the refrigerant. And, the moisture-removed first air stream is discharged to outside the room from the exhaust air blowout opening (23) as exhaust air (EA).

Meanwhile, after flowing in from the room air suction opening (22), the second air stream is introduced into the first heat exchange chamber (41) and passes through the first heat exchanger (61). In the first heat exchanger (61), the adsorbent supported on the external surface is heated by the refrigerant, as a result of which the adsorbent is regenerated. And, the second air stream humidified by moisture desorbed from the adsorbent is supplied into the room from the supply air blowout opening (24) as supply air (SA).

Next, a second operation of the circulation/humidification mode is described with reference to FIGS. 2A and 2B and FIGS. 11A-11C. In the second operation, humidification of room air (RA) as a second air stream takes place in the second heat exchanger (62) and recovery of moisture from outside air (OA) as a first air stream takes place in the first heat exchanger (61).

Figure 11A:
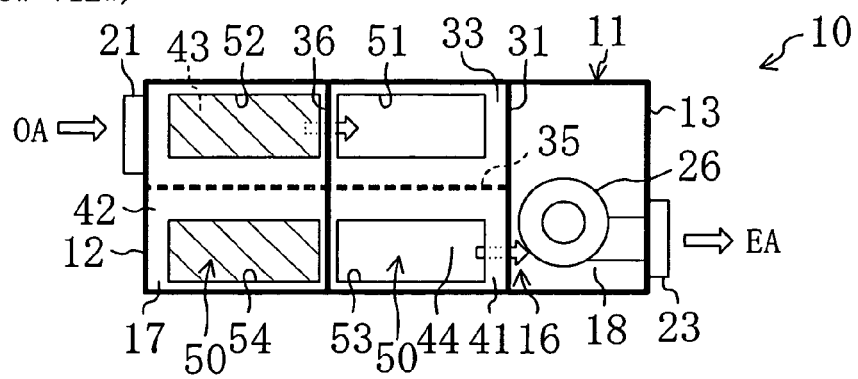
FIG. 11A is a cross sectional view of the humidity controller apparatus showing the flow of air streams in a second operation of the circulation and humidification mode, the view being taken along the line X-X in FIG. 11B.
Figure 11B:
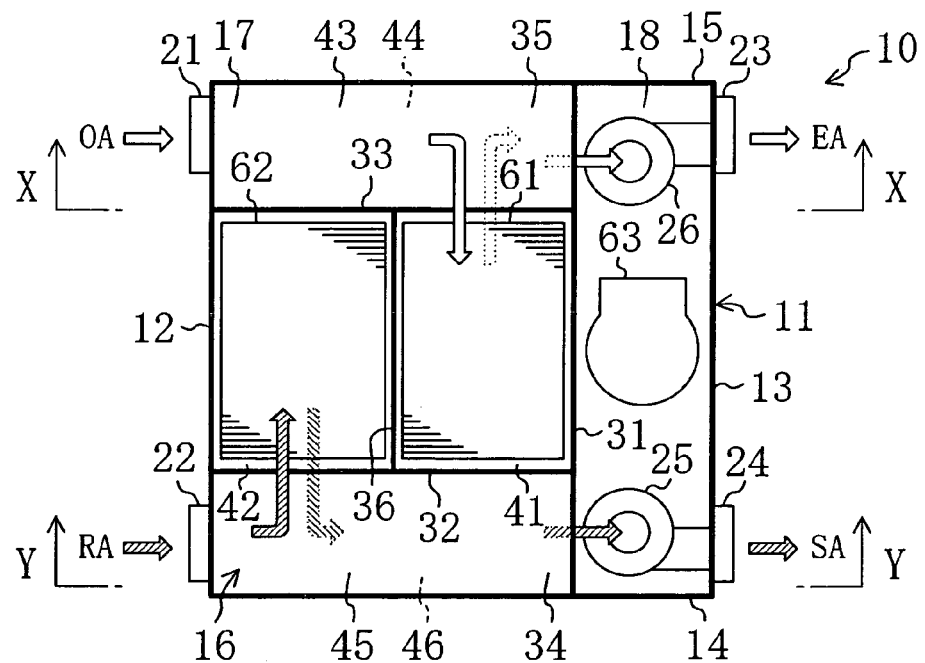
FIG. 11B is a schematic top plan view of the humidity controller apparatus showing the flows of air streams in the second operation of the circulation and humidification mode.
Figure 11C:
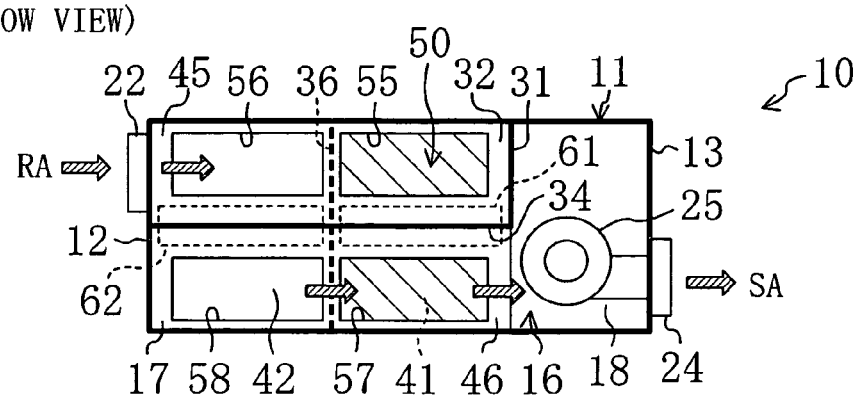
FIG. 11C is a cross sectional view of the humidity controller apparatus showing the flows of air streams in the second operation of the circulation and humidification mode, the view being taken along the line Y-Y in FIG. 11B.

In the second operation, in the refrigerant circuit (60) the four-way selector valve (64) changes state to a state as shown in FIG. 2B, and a second refrigeration cycle operation is carried out. In addition, the damper of each opening (51, . . . , 55, . . . ) which constitutes a respective switching mechanism (50) is set in a second distribution state of the circulation/humidification mode. In this state, the first opening (51), the third opening (53), the sixth opening (56), and the eighth opening (58) enter the open state. On the other hand, the second opening (52), the fourth opening (54), the fifth opening (55), and the seventh opening (57) enter the closed state. Consequently, as shown in FIGS. 11A-11C, outside air (OA) as a first air stream is supplied to the first heat exchanger (61) while, on the other hand, room air (RA) as a second air stream is supplied to the second heat exchanger (62).

More specifically, after flowing in from the outside air suction opening (21), the first air stream is introduced into the first heat exchange chamber (41) and passes through the first heat exchanger (61). In the first heat exchanger (61), moisture present in the first air stream is adsorbed on the adsorbent supported on the surface of the first heat exchanger (61), and resulting heat of adsorption is absorbed by the refrigerant. And, the moisture-removed first air stream is discharged to outside the room from the exhaust air blowout opening (23) as exhaust air (EA).

Meanwhile, after flowing in from the room air suction opening (22), the second air stream flows into the second heat exchange chamber (42) and passes through the second heat exchanger (62). In the second heat exchanger (62), the adsorbent supported on the external surface is heated by the refrigerant, as a result of which the adsorbent is regenerated. And, the second air stream humidified by moisture desorbed from the adsorbent is supplied into the room from the supply air blowout opening (24) as supply air (SA).

Control Operation of Controller

The control operation of the controller (70) is described.

The capacity control part (71) of the controller (70) maintains the capacity of the compressor (63) at a reference capacity. In other words, the capacity control part (71) keeps the capacity of the compressor (63) at a constant capacity, regardless of the state of the switching mechanism (50) and the operational switching of the refrigerant circuit (60). The reference capacity of the compressor (63) is a capacity which is set depending on the load of the humidity controller apparatus (10) (i.e., the amount of dehumidification or the amount of humidification required to the humidity controller apparatus (10) depending on the indoor latent heat load).

The opening control part (72) of the controller (70) maintains the opening of the electric expansion valve (65) at a reference opening. In other words, the opening control part (72) keeps the opening of the electric expansion valve (65) at a constant opening, regardless of the state of the switching mechanism (50) and the operational switching of the refrigerant circuit (60). The reference opening of the electric expansion valve (65) is an opening which is set depending on the operational status of the refrigerant circuit (60) (e.g., the temperature of air delivered to the heat exchangers (61, 62) as a first or second air stream and the temperature and the pressure of refrigerant at each part of the refrigerant circuit (60)).

The switching control part (73) of the controller (70) operates the four-way selector valve (64) and the switching mechanism (50) at a switching time interval set by the interval set part (74) so that the operation of the refrigerant circuit (60) is switched simultaneously with switching of the distribution routes of first and second air streams.

The interval set part (74) of the controller (70) sets a switching time interval depending on the load of the humidity controller apparatus (10). More specifically, the interval set part (74) makes a comparison between an actual measurement value and a target value of the relative humidity of room air and then adjusts the switching time interval so that the actual measurement value and the target value agree with each other. In doing so, the interval set part (74) sets the switching time interval shorter as the load of the humidity controller apparatus (10) increases, i.e., as the difference between an actual measurement value and a target value of the relative humidity of room air increases.

Suppose here that an interval of three minutes is set as a reference value of the switching time interval. It should be noted that any of the following switching time interval numeric values is merely an example. When there is produced a great difference between an actual measurement value and a target value of the room air relative humidity (for example, immediately after activating the humidity controller apparatus (10)), the interval set part (74) reduces the switching time interval to an interval of two minutes from an interval of three minutes, thereby increasing the humidity control capability of the humidity controller apparatus (10). Thereafter, when the actual measurement value of the room air relative humidity approaches the target value, the interval set part (74) brings the switching time interval back to an interval of three minutes from an interval of two minutes.

In addition, if the actual measurement value of the indoor relative humidity exceeds the target value during humidification, or if the actual measurement value of the indoor relative humidity falls below the target value during dehumidification, then the interval set part (74) extends the switching time interval from an interval of three minutes to an interval of four minutes, thereby reducing the humidity control capability of the humidity controller apparatus (10).

Figure 12:
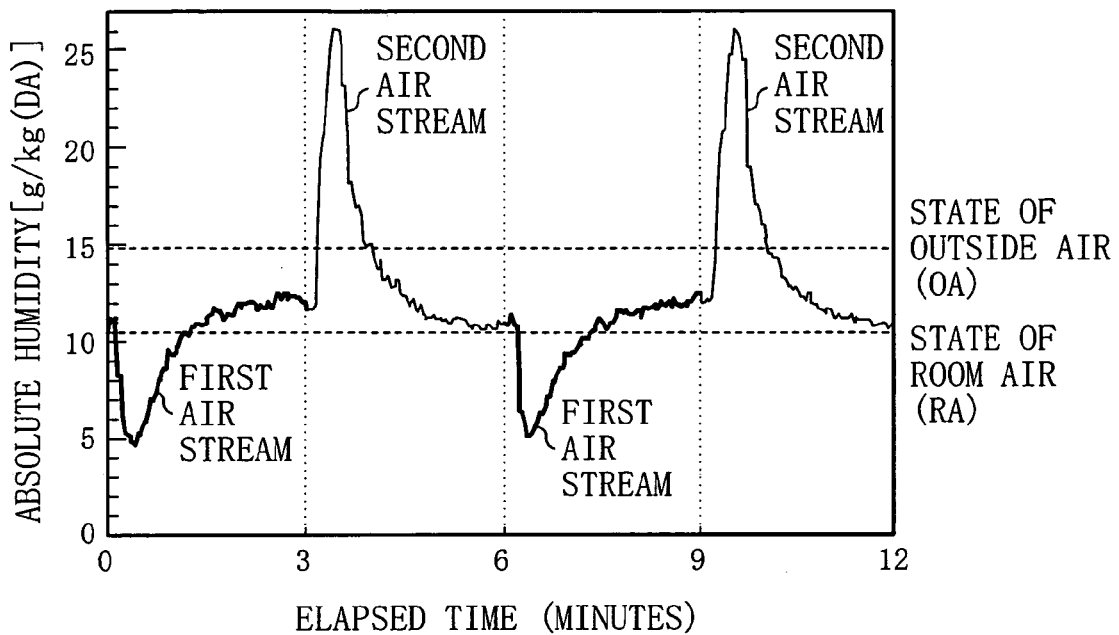
FIG. 12 is an elapsed-time versus absolute-humidity relationship diagram graphically showing variations in absolute humidity of first and second air streams for the case where the switching time interval is three minutes.
Figure 13:
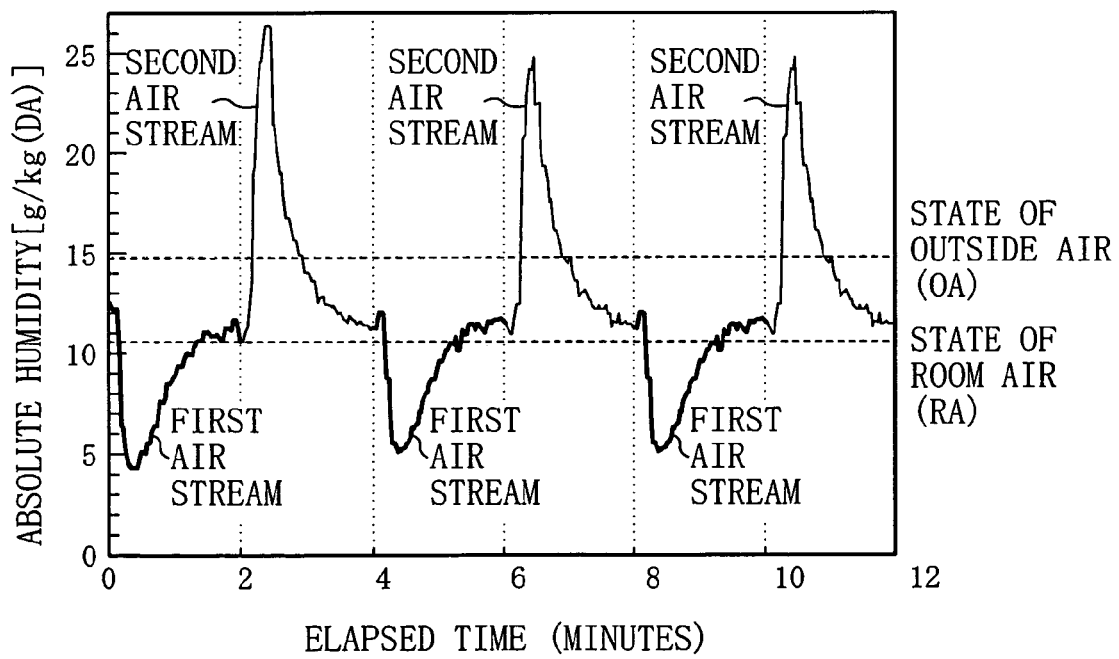
FIG. 13 is an elapsed-time versus absolute-humidity relationship diagram graphically showing variations in absolute humidity of first and second air streams for the case where the switching time interval is two minutes.

With reference to FIGS. 12 and 13, the reason that the humidity control capability of the humidity controller apparatus (10) varies with the change in switching time interval is described. FIGS. 12 and 13 graphically show variations with time in absolute humidity of each of first and second air streams after passage through the second heat exchanger (62) during the ventilation/dehumidification mode. In addition, in FIGS. 12 and 13, the point of time when the first operation of the humidity controller apparatus (10) is started serves as a starting point, i.e., a zero-minute elapsed time point.

When the switching time interval is set at an interval of three minutes (see FIG. 12), the absolute humidity of the first air stream after passage through the second heat exchanger (62) drops abruptly within about 20 seconds from the start of the first operation. Thereafter, the absolute humidity of the first air stream increases to the point of time at which about two minutes have elapsed since the start of the first operation. Then, the absolute humidity of the first air stream remains at relatively high levels until switching to the second operation. After the switching to the second operation, the absolute humidity of the second air stream after passage through the second heat exchanger (62) rises abruptly within about 25 seconds from the start of the second operation. Thereafter, the absolute humidity of the second air stream drops to the point of time at which about two minutes have elapsed since the start of the second operation. During a period from that time to the point of time of switching to the second operation, the second air stream is little humidified.

As can be seen from the above, most of moisture adsorption on the adsorbent taking place in a single first operation is effected intensively within a short period of time from the start of the first operation. On the other hand, most of moisture desorption from the adsorbent taking place in a single second operation is effected intensively within a short period of time from the start of the second operation. The process of such adsorption/desorption is the same as in the case where the switching time interval is set at an interval of two minutes (see FIG. 13). For example, within a period of two minutes from the start of a first operation, the integration value of amounts of dehumidification from a first air stream for the case where the switching time interval is set at an interval of two minutes is approximately the same as that for the case where the switching time interval is set at an interval of three minutes. In addition, for example, within a period of two minutes from the start of a second operation, the integration value of amounts of humidification to a second air stream for the case where the switching time interval is set at an interval of two minutes is approximately the same as that for the case where the switching time interval is set at an interval of three minutes. Accordingly, if the frequency of a first operation and the frequency of a second operations are increased by reducing the switching time interval, this increases the amount of dehumidification from a first air stream and the amount of humidification to a second air stream.

Effects of Embodiment 1

In the present embodiment, the controller (70) is provided with the interval set part (74). The switching time interval, at which the first operation and the second operation are interswitched, is set depending on the load of the humidity controller apparatus (10). As a result of such arrangement in the present embodiment, the humidity control capability exerted by the humidity controller apparatus (10) is set adequately depending on the load of the humidity controller apparatus (10). Stated another way, it becomes possible to adequately set the humidity control capability of the humidity controller apparatus (10) depending on the indoor latent heat load without an excess or deficiency. As the result of this, indoor comfort is improved to a further extent and, in addition, energy savings are achieved by adequately adjusting the humidity control capability of the humidity controller apparatus.

In addition, the interval set means (74) of the present embodiment reduces the switching time interval with the increase in the load of the humidity controller apparatus (10), in consideration of the characteristic of the humidity controller apparatus (10) which performs a so-called batch running operation, i.e., the characteristic that moisture adsorption/desorption for the adsorbent takes places intensively within a relatively short period of time after operational interswitching. Therefore, in accordance with the present embodiment, the humidity control capability of the humidity controller apparatus (10) can assuredly be adjusted by a simple technique, such as by adjustment in the switching interval time.

Modified Version of Embodiment 1

In the above-described embodiment, the humidity control function of the humidity controller apparatus (10) may be on/off controlled depending on the humidity control load, in addition to adjustment in the switching time interval by the interval set part (74) of the controller (70). For example, if the humidity control capability of the humidity controller apparatus (10) is excessive relative to the indoor latent heat load even when the switching time interval is set at an upper limit, it may be arranged that the compressor (63) is stopped, together with the switching mechanism (50), and the humidity control function of the humidity controller apparatus (10) is stopped.

However, during the ventilation/dehumidification mode and during the ventilation/humidification mode, room ventilation must be continued even when the humidity control function of the humidity controller apparatus (10) is brought to a stop. In other words, during the ventilation/dehumidification mode and during the ventilation/humidification mode, the exhaust fan (26) and the supply fan (25) are operated continuously so that the room is ventilated continuously.

Embodiment 2 of Invention

A second embodiment of the present invention is a modification as a result of modifying the configuration of the switching control part (73) of the controller (70) of the first embodiment. Here, differences of the present embodiment with the first embodiment are described.

Figure 14:
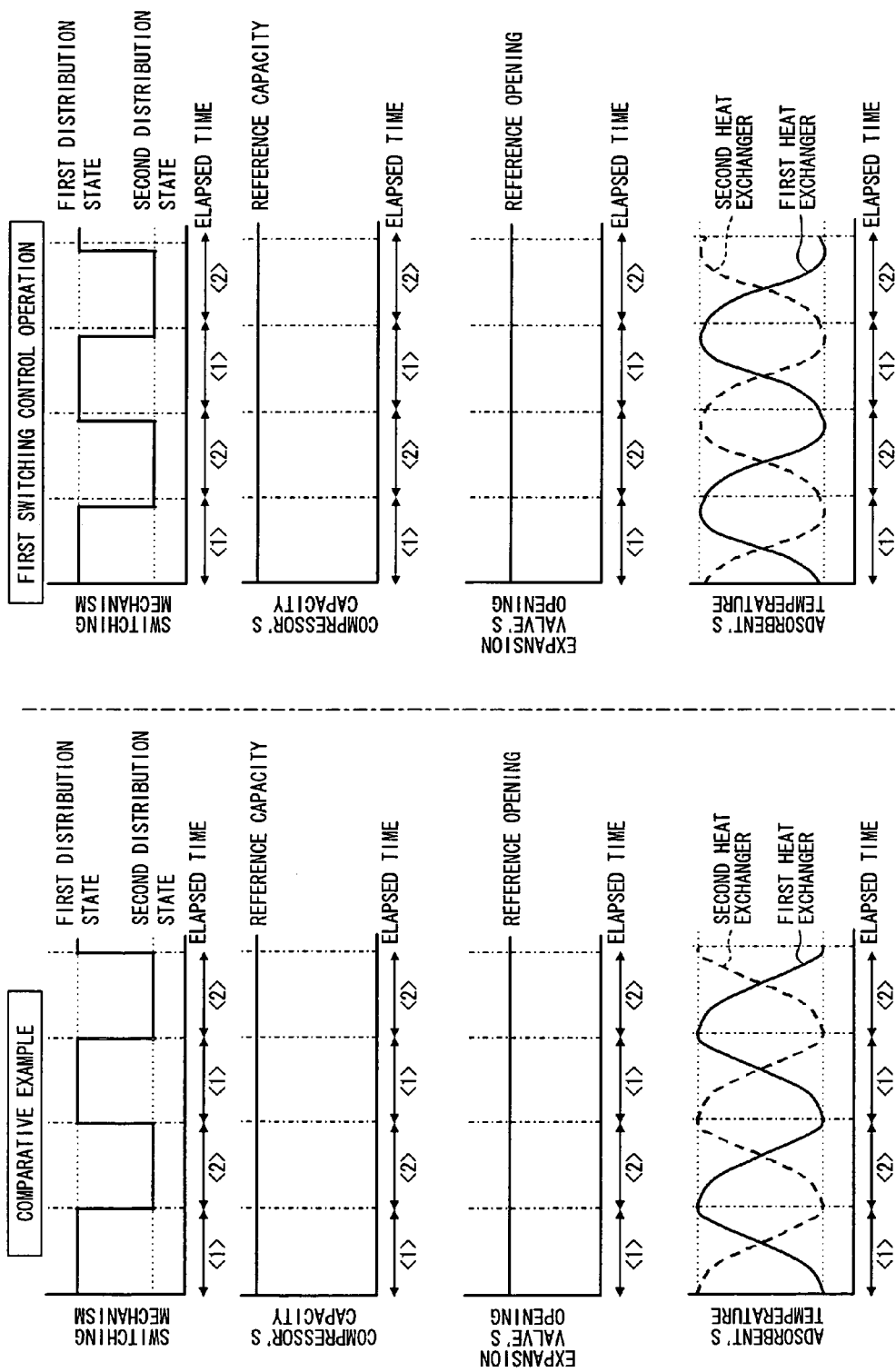
FIG. 14 is a time chart showing an operation state during a first switching control operation in a humidity controller apparatus of a second embodiment of the present invention.
Figure 15:
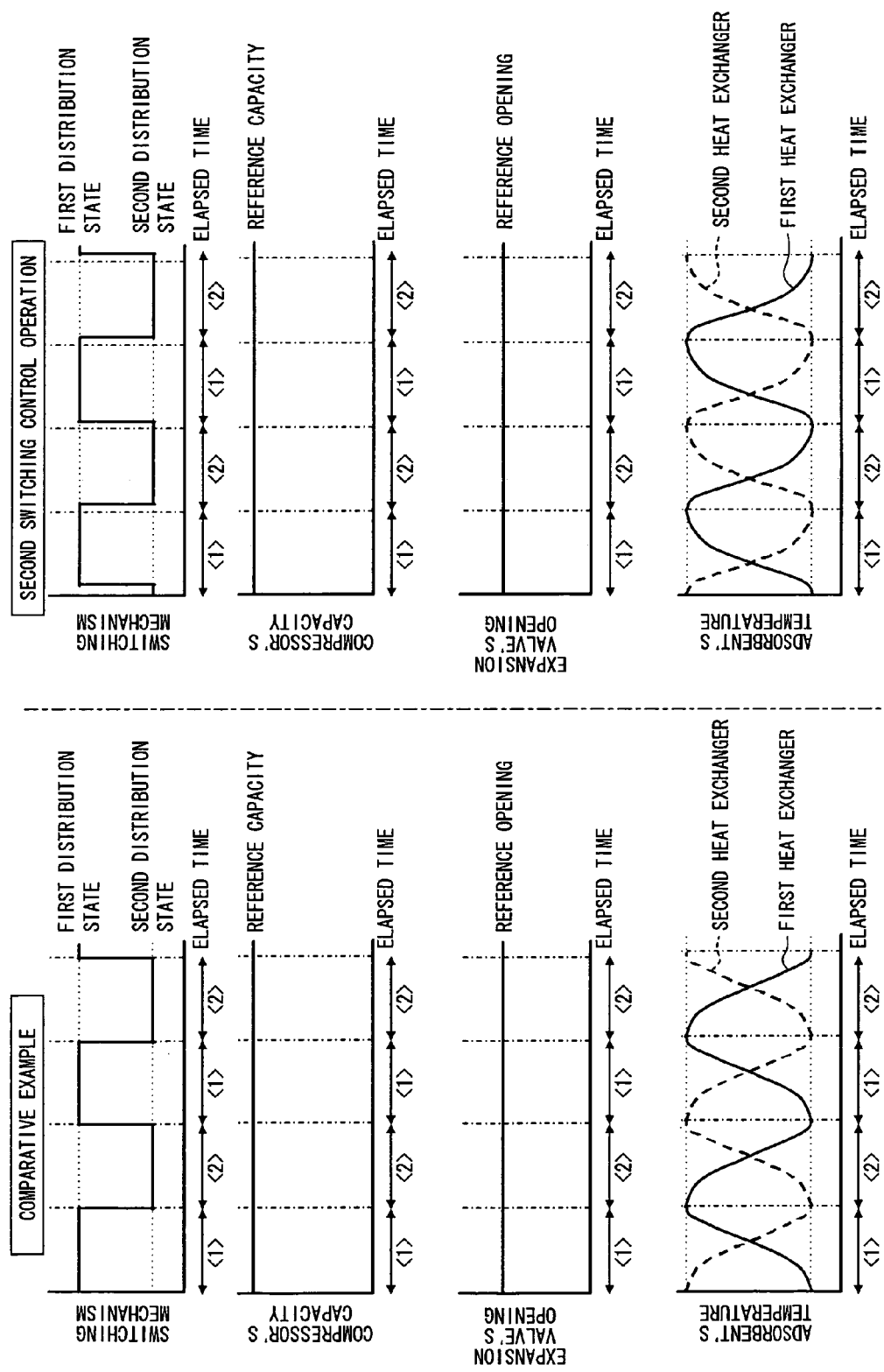
FIG. 15 is a time chart showing an operation state during a second switching control operation in the humidity controller apparatus of the second embodiment.

The switching control means (73) of the present embodiment is configured such that it performs switching of the operation of the refrigerant circuit (60) and switching of the distribution routes of first and second air streams, which is the same as the first embodiment. However, as shown in FIGS. 14 and 15, the switching control part (73) of the present embodiment operates to perform switching of the operation of the refrigerant circuit (60) and switching of the distribution routes of first and second air streams at different timing intervals. The switching control part (73) of the present embodiment constitutes a switching control means.

The switching control part (73) of the present embodiment is capable of two different switching control operations and is configured such that it selects either one of the two different switching control operations depending on the temperature of air streams taken into the casing (11) as first and second air streams.

More specifically, the switching control part (73) performs a first switching control operation for preswitching the distribution routes of air streams within the casing (11) a predetermined length of time ahead of switching of the refrigeration cycle operation of the refrigerant circuit (60) and a second switching control operation for switching the distribution routes of air streams within the casing (11) after an elapse of a predetermined length of time since the switching of the refrigeration cycle operation of the refrigerant circuit (60). More specifically, the switching control part (73) performs a first switching operation if the temperature of a second air stream is higher than the temperature of a first air stream on the way to the heat exchangers (61, 62). On the other hand, if the temperature of a first air stream is higher than the temperature of a second air stream on the way to the heat exchangers (61, 62), the switching control part (73) performs a second switching operation.

Control Operation of Controller

The control operation of the controller (70) is described by making reference to FIGS. 14 and 15. FIGS. 14 and 15 show variations, respectively, in the state of the switching mechanism (50), in the capacity of the compressor (63), in the opening of the electric expansion valve (65), in the adsorbent temperature of the first heat exchanger (61), and in the adsorbent temperature of the second heat exchanger (62), when the refrigeration cycle operation of the refrigerant circuit (60) is switched alternately in the order of a first operation, a second operation, a first operation, and a second operation.

The switching control part (73) of the present embodiment selectively performs either one of a first switching control operation and a second switching control operation depending on the temperature of first and second air streams taken into the casing (11).

When a second air stream taken into the casing (11) has a higher temperature than a first air stream, the switching control part (73) performs a first switching control operation. Such a case corresponds to the case where a circulation/dehumidification mode is carried out with the room being cooled in the summertime and to the case where a circulation/humidification mode is carried out with the room being heated in the wintertime.

As shown in FIG. 14, in the first switching control operation, the switching mechanism (50) is switched a predetermined length of time ahead of switching of the refrigeration cycle operation of the refrigerant circuit (60). The first switching control operation is described taking, as an example, a case where the operation of the refrigerant circuit (60) is switched at an interval of three minutes, i.e., a case where the switching cycle of the four-way selector valve (64) is three minutes. In this case, the switching control part (73) operates the switching mechanism (50) upon an elapse of for example two minutes and forty-five seconds since the four-way selector valve (64) is switched, thereby to switch the distribution routes of first and second air streams. And, the switching control part (73) operates the four-way selector valve (64) upon an elapse of fifteen seconds since the switching mechanism (50) is operated, thereby to switch the refrigeration cycle operation of the refrigerant circuit (60).

For example, in switching from a first refrigeration cycle operation to a second refrigeration cycle operation, the first heat exchanger (61) acting as a condenser is switched to act as an evaporator while, on the other hand, the second heat exchanger (62) acting as an evaporator is switched to act as a condenser. When the switching control part (73) conducts a first switching control operation at that time, a first air stream of relatively low temperature is delivered to the first heat exchanger (61) slightly before the first heat exchanger (61) acting as a condenser switches to act as an evaporator. In addition, a second air stream of relatively high temperature is delivered to the second heat exchanger (62) before the second heat exchanger (62) acting as an evaporator switches to act as a condenser. As the result of this, the temperature of the adsorbent provided in the first heat exchanger (61) falls lower and the temperature of the adsorbent provided in the second heat exchanger (62) rises higher, when compared to a comparative example in which the four-way selector valve (64) and the switching mechanism (50) are operated at the same time.

On the other hand, when the temperature of a first air stream taken into the casing (11) is higher than the temperature of a second air stream, the switching control part (73) performs a second switching control operation. Such a case corresponds to a case where a ventilation/dehumidification mode is performed with the room being cooled in the summertime and to a case where a ventilation/humidification mode is carried out with the room being heated in the wintertime.

As shown in FIG. 15, in the second switching control operation, the switching mechanism (50) is switched after an elapse of a predetermined length of time since the refrigeration cycle operation of the refrigerant circuit (60) is switched. The second switching control operation is described taking, as an example, a case where the operation of the refrigerant circuit (60) is switched at an interval of three minutes, i.e., a case where the switching cycle of the four-way selector valve (64) is three minutes. In this case, the switching control part (73) does not operate the switching mechanism (50) at the point of time when the four-way selector valve (64) is switched, and the distribution routes of air streams are maintained. Thereafter, the switching control part (73) operates the switching mechanism (50) upon an elapse of for example fifteen seconds since the four-way selector valve (64) is switched, thereby to switch the distribution routes of the first and second air streams. And, the switching control part (73) operates the four-way selector valve (64) upon an elapse of two minutes and forty-five seconds since the switching mechanism (50) is operated, thereby to switch the refrigeration cycle operation of the refrigerant circuit (60).

For example, in switching from a first refrigeration cycle operation to a second refrigeration cycle operation, the first heat exchanger (61) acting as a condenser is switched to act as an evaporator while, on the other hand, the second heat exchanger (62) acting as an evaporator is switched to act as a condenser. When the switching control part (73) performs a second switching control operation at that time, a second air stream of relatively low temperature is continuously delivered to the first heat exchanger (61) for a while even after the first heat exchanger (61) acting as a condenser is switched to act as an evaporator. In addition, a first air stream of relatively high temperature is continuously delivered to the second heat exchanger (62) for a while even after the second heat exchanger (62) acting as an evaporator is switched to act as a condenser. As the result of this, the temperature of the adsorbent provided in the first heat exchanger (61) falls quickly and the temperature of the adsorbent provided in the second heat exchanger (62) rises quickly, when compared to a comparative example in which the four-way selector valve (64) and the switching mechanism (50) are operated at the same time.

Effects of Embodiment 2

As described above, the present embodiment enables rapid variations in the temperature of the adsorbent supported on the surface of each of the heat exchangers (61, 62) after switching of the operation of the refrigerant circuit (60). This makes it possible to reduce the time from when the refrigeration cycle operation of the refrigerant circuit (60) is switched to when the adsorbent reaches a temperature capable of allowing the adsorbent to effect sufficient moisture adsorption/desorption. Accordingly, in accordance with the present embodiment, the amount of moisture being adsorbed on the adsorbent and the amount of moisture being desorbed from the adsorbent will increase. And, as a result of such arrangement, it becomes possible to improve the humidity control capability of the humidity controller apparatus (10).

Embodiment 3 of Invention

A third embodiment of the present invention is a modification as a result of modifying the configuration of the capacity control part (71) of the controller (70) of the second embodiment. Here, differences of the present embodiment with the second embodiment are described.

Figure 16:
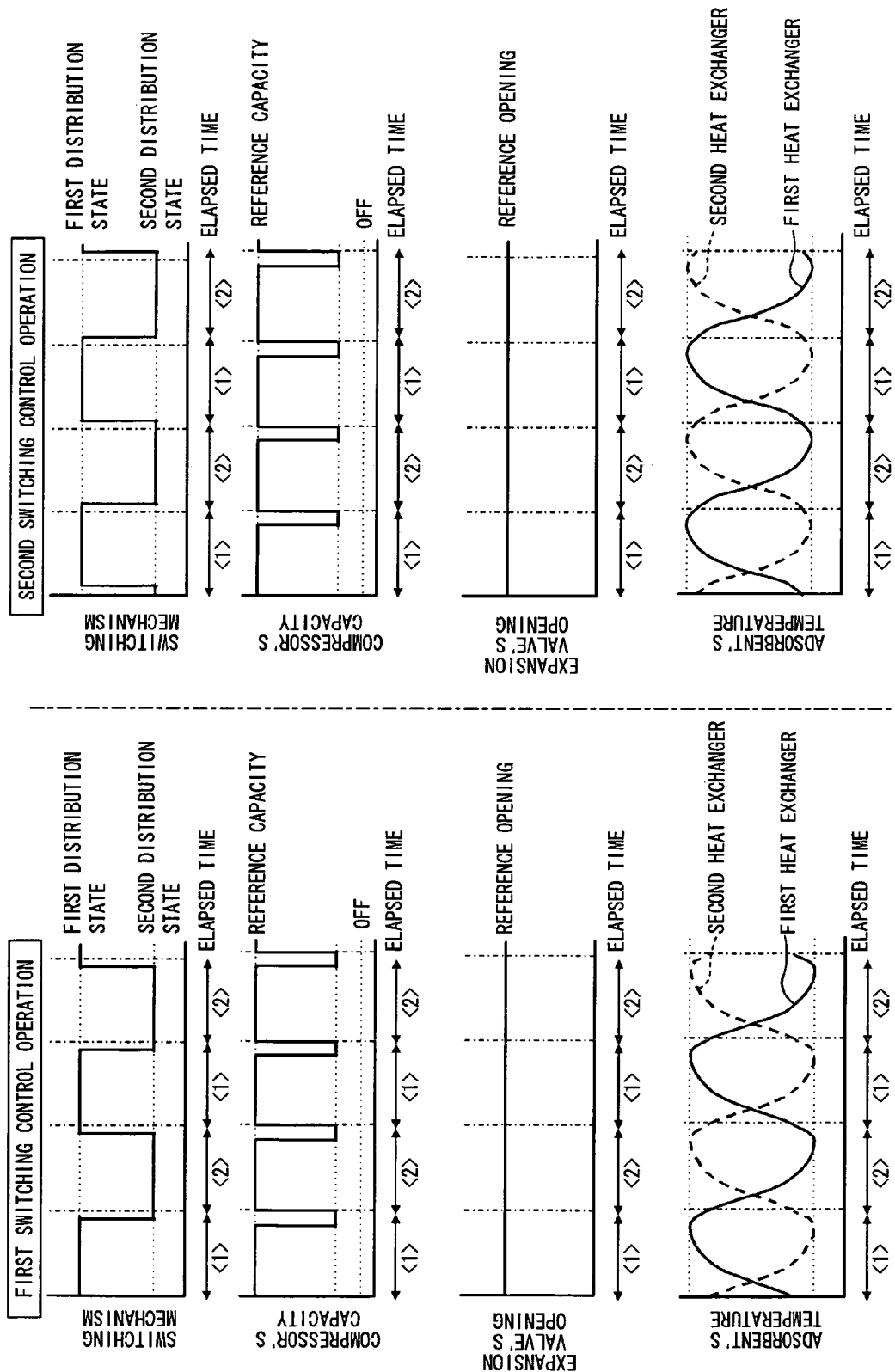
FIG. 16 is a time chart showing an operation state of a humidity controller apparatus in a third embodiment of the present invention.

As shown in FIG. 16, the capacity control part (71) of the present embodiment constitutes a capacity control means for varying the capacity of the compressor (63) at the same cycle as the cycle at which the refrigeration cycle operation of the refrigerant circuit (60) is switched.

More specifically, the capacity control part (71) of the present embodiment performs a control operation for temporarily holding the capacity of the compressor (63) at a low capacity level prior to switching of the refrigeration cycle operation of the refrigerant circuit (60) and then bringing the capacity of the compressor (63) back to a reference capacity level upon the switching of the refrigeration cycle operation of the refrigerant circuit (60). The capacity control part (71) performs the control operation every time the refrigeration cycle operation of the refrigerant circuit (60) is switched. In addition, the capacity control part (71) repeatedly performs the control operation, independently of whether the switching control part (73) is in a first switching control operation or in a second switching control operation.

The control operation of the capacity control part (71) is described taking as an example a case where the operation of the refrigerant circuit (60) is switched at an interval of three minutes. In this case, the capacity control part (71) operates the compressor (63) at the reference capacity level from the time immediately after the four-way selector valve (64) is switched. And, after an elapse of for example two minutes and thirty seconds since that switching, the capacity control part (71) reduces the capacity of the compressor (63) down to a predetermined low capacity level. Thereafter, the capacity control part (71) holds the capacity of the compressor (63) at the low capacity level for thirty seconds until the time the four-way selector valve (64) is again switched. When the four-way selector valve (64) is switched, the capacity control part (71) brings the capacity of the compressor (63) back to the original reference capacity level.

Here, a case in which the refrigerant circuit (60) makes a switch from a first refrigeration cycle operation to a second refrigeration cycle operation is described. During the first refrigeration cycle operation, moisture is desorbed from the adsorbent of the first heat exchanger (61) which becomes a condenser while, on the other hand, moisture present in an air stream is adsorbed on the adsorbent of the second heat exchanger (62) which becomes an evaporator. And, on the verge of completion of the first refrigeration cycle operation, moisture is not desorbed very much from the adsorbent of the first heat exchanger (61) which becomes a condenser even when heated continuously, and moisture is not adsorbed very much on the adsorbent of the second heat exchanger (62) which becomes an evaporator even when cooled continuously. In other words, even if the compressor (63) is continuously operated at a large capacity level to the verger of switching of the refrigeration cycle operation of the refrigerant circuit (60), the effect of increasing the amount of dehumidification from the first air stream and the effect of increasing the amount of humidification to the second air stream are not expected very much.

To cope with the above, the capacity control part (71) reduces the capacity of the compressor (63) for cutting down the input to the compressor (63), at the stage slightly prior to switching of the operation of the refrigerant circuit (60) where any increase in the amount of dehumidification and the amount of humidification is no longer expected. Accordingly, the present embodiment reduces the power consumption of the compressor (63) while maintaining the amount of dehumidification and the amount of humidification obtained in the humidity controller apparatus (10), thereby making it possible to aim at accomplishing energy savings for the humidity controller apparatus (10).

In addition, when the capacity of the compressor (63) diminishes prior to switching of the operation of the refrigerant circuit (60), the capability to heat adsorbent and the capability to cool adsorbent are reduced proportionally. Consequently, in comparison with a case where the capacity of the compressor (63) is kept constant, at the point of time when the refrigeration cycle operation of the refrigerant circuit (60) is switched, the adsorbent temperature decreases in the heat exchanger (61, 62) that converts into an evaporator from a condenser, and increases in the heat exchangers (61, 62) that converts into a condenser from an evaporator. Therefore, in accordance with the present embodiment, it becomes possible to reduce the time from when the refrigeration cycle operation of the refrigerant circuit (60) is switched to when the adsorbent reaches a temperature capable of allowing the adsorbent to effect sufficient moisture adsorption/desorption. As a result, the humidity control capability of the humidity controller apparatus (10) is improved to a further extent.

Embodiment 4 of Invention

A fourth embodiment of the present invention is a modification as a result of modifying the configuration of the opening control part (72) of the controller (70) of the second embodiment. Here, differences of the present embodiment with the second embodiment are described.

Figure 17:
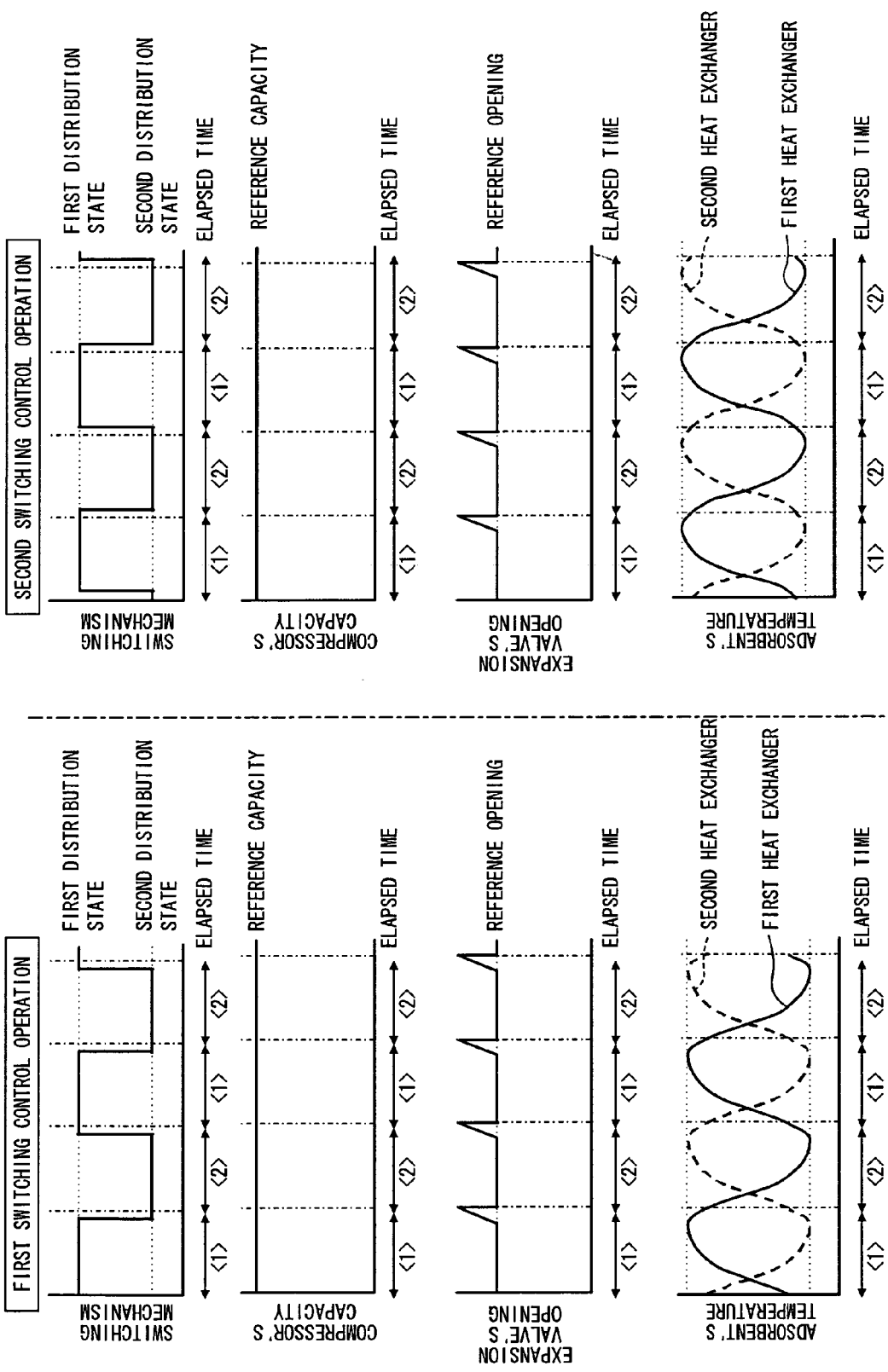
FIG. 17 is a time chart showing an operation state of a humidity controller apparatus in a fourth embodiment of the present invention.

As shown in FIG. 17, the opening control part (72) of the present embodiment constitutes an opening control means for varying the opening of the electric expansion valve (65) at the same cycle as the cycle at which the refrigeration cycle operation of the refrigerant circuit (60) is switched.

More specifically, the opening control part (72) of the present embodiment performs a control operation for gradually expanding the opening of the electric expansion valve (65) from the time slightly before the refrigeration cycle operation of the refrigerant circuit (60) is switched and then bringing the opening of the electric expansion valve (65) back to a reference opening level upon the switching of the refrigeration cycle operation of the refrigerant circuit (60). The opening control part (72) performs the control operation every time the refrigeration cycle operation of the refrigerant circuit (60) is switched. In addition, the opening control part (72) repeatedly performs the control operation, independently of whether the switching control part (73) is in a first switching control operation or in a second switching control operation.

The control operation of the opening control part (72) is described taking as an example a case where the operation of the refrigerant circuit (60) is switched at an interval of three minutes. In this case, the opening control part (72) holds the opening of the electric expansion valve (65) at the reference opening level from the time immediately after the four-way selector valve (64) is switched. And, the opening control part (72) starts increasing the opening of the electric expansion valve (65) after an elapse of for example two minutes and thirty seconds since that switching. Thereafter, the opening control part (72) keeps increasing the opening of the electric expansion valve (65) for thirty seconds until the four-way selector valve (64) is again switched. Upon the switching of the four-way selector valve (64), the opening control part (72) brings the opening of the electric expansion valve (65) back to the original reference opening level.

As described in the description of the third embodiment, at the stage slightly prior to switching of the refrigeration cycle operation of the refrigerant circuit (60), any increase in the amount of dehumidification and the amount of humidification is no longer expected. To cope with this, the opening control part (72) increases the opening of the electric expansion valve (65) in such a state. As the opening of the electric expansion valve (65) increases, the high-low pressure difference is reduced, thereby reducing power consumption in the compressor (63) which compresses refrigerants. Accordingly, the present embodiment makes it possible to cut down the amount of power consumed by the compressor (63) while at the same time maintaining the amount of dehumidification and the amount of humidification obtained in the humidity controller apparatus (10), thereby making it possible to aim at accomplishing energy savings in the humidity controller apparatus (10), as in the second embodiment.

In addition, as the opening of the electric expansion valve (65) is increased prior to switching of the operation of the refrigerant circuit (60), the capability to heat adsorbent and the capability to cool adsorbent are reduced proportionally. This makes it possible to reduce the time from when the refrigeration cycle operation of the refrigerant circuit (60) is switched to when the adsorbent reaches a temperature capable of allowing the adsorbent to effect sufficient moisture adsorption/desorption. As a result, the humidity control capability of the humidity controller apparatus (10) is improved further, as in the third embodiment.

Modified Version of Embodiment 4

In the present embodiment, the capacity control part (71) of the controller (70) may be configured in the same way as in the third embodiment. In other words, the capacity control part (71) of the present embodiment may be so configured as to vary the capacity of the compressor (63) at the same cycle as the cycle at which the refrigeration cycle operation of the refrigerant circuit (60) is switched. And, in the present modified version, both the controlling of the opening of the electric expansion valve (65) by the opening control part (72) and the controlling of the capacity of the compressor (63) by the capacity control part (71) are performed in response to switching of the operation of the refrigerant circuit (60).

Embodiment 5 of Invention

A fifth embodiment of the present invention is a modification as a result of modifying the configuration of the capacity control part (71) of the controller (70) of the second embodiment. Here, differences of the present embodiment with the second embodiment are described.

Figure 18:
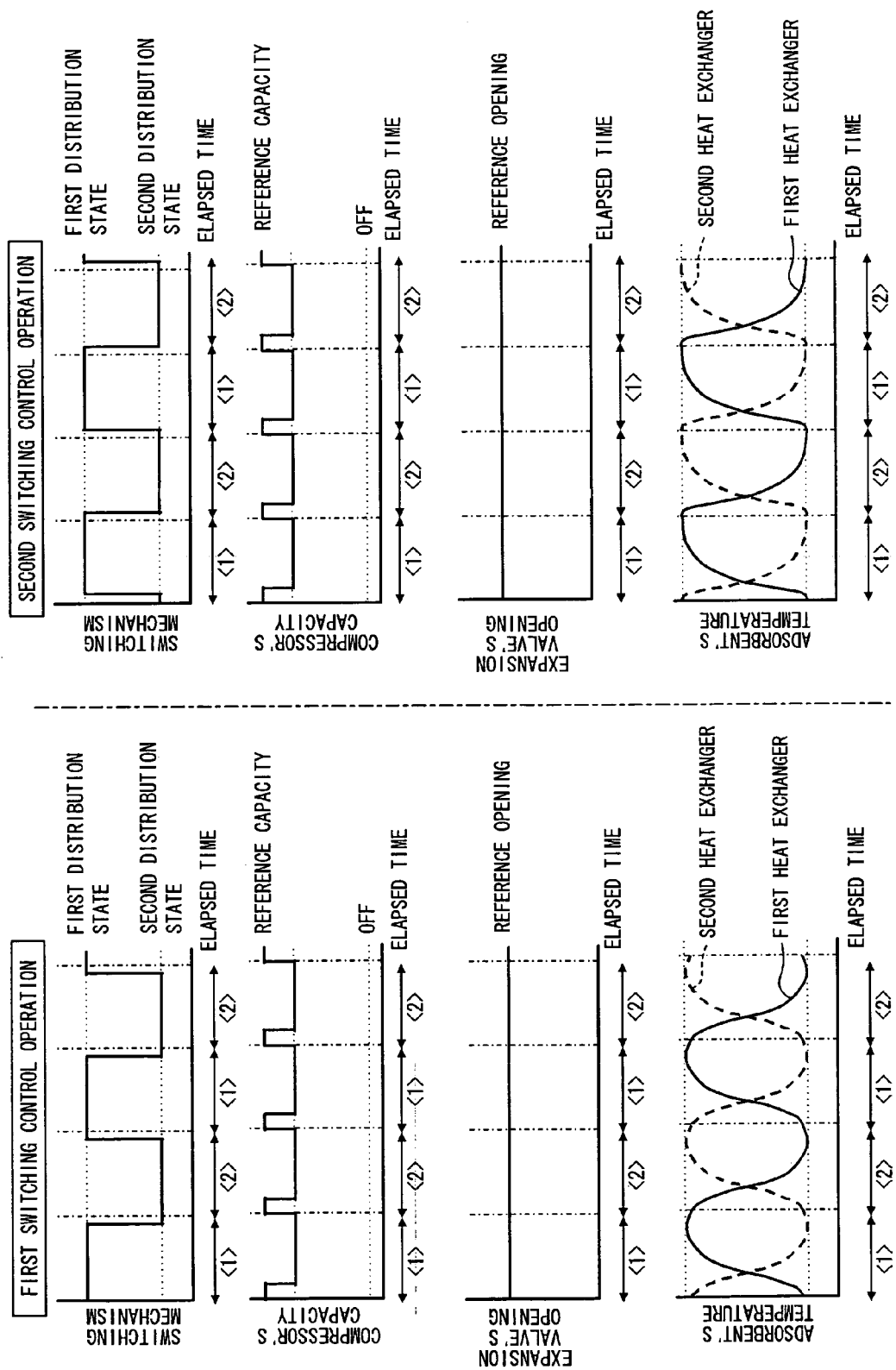
FIG. 18 is a time chart showing an operation state of a humidity controller apparatus in a fifth embodiment of the present invention.

As shown in FIG. 18, the capacity control part (71) of the present embodiment constitutes a capacity control means for varying the capacity of the compressor (63) at the same cycle as the cycle at which the refrigeration cycle operation of the refrigerant circuit (60) is switched.

More specifically, the capacity control part (71) of the present embodiment performs a control operation for holding the capacity of the compressor (63) at a higher capacity level than the reference capacity level until a predetermined length of time elapses from the time immediately after switching of the operation of the refrigerant circuit (60) and then bringing the capacity of the compressor (63) back to the reference capacity level and holding it there. The capacity control part (71) performs the control operation every time the refrigeration cycle operation of the refrigerant circuit (60) is switched. In addition, the capacity control part (71) repeatedly performs the control operation, independently of whether the switching control part (73) is in a first switching control operation or in a second switching control operation.

The control operation of the capacity control part (71) is described taking as an example a case where the refrigeration cycle operation of the refrigerant circuit (60) is switched at an interval of three minutes. In this case, the capacity control part (71) holds the capacity of the compressor (63) at a greater capacity level than the reference capacity level for for example thirty seconds from the time immediately after switching of the four-way selector valve (64). Thereafter, the capacity control part (71) reduces the capacity of the compressor (63) down to the reference capacity level and then keeps the capacity of the compressor (63) constant for two minutes and thirty seconds until the time the four-way selector (64) is switched next.

As described above, in order for the humidity controller apparatus (10) to exhibit sufficient humidity control capabilities, desirably the adsorbent temperature is rapidly decreased in the heat exchanger (61, 62) that has converted into an evaporator from a condenser and the adsorbent temperature is rapidly increased in the heat exchanger (61, 62) that has converted into a condenser from an evaporator.

To this end, in the present embodiment the capacity control part (71) of the controller (70) performs the above-described control operation so that the compressor (63) is temporarily operated at a greater capacity level immediately after the operation of the refrigerant circuit (60) is switched. In other words, the capacity of the compressor (63) is temporarily increased by the control operation of the capacity control part (71) when the temperature of the adsorbent supported on the surface of each of the heat exchangers (61, 62) should be varied rapidly, i.e., immediately after switching of the operation of the refrigerant circuit (60).

As a result of such arrangement, for example during switching from a first refrigeration cycle operation to a second refrigeration cycle operation, the temperature of the adsorbent falls quickly in the first heat exchanger (61) which has converted into an evaporator from a condenser while, on the other hand, the temperature of the adsorbent rises quickly in the second heat exchanger (61) which has converted into a condenser from an evaporator. Therefore, in accordance with the present embodiment, it becomes possible to reduce the time from when the refrigeration cycle operation of the refrigerant circuit (60) is switched to when the adsorbent reaches a temperature capable of allowing the adsorbent to effect sufficient moisture adsorption/desorption. As a result, the humidity control capability of the humidity controller apparatus (10) is improved to a further extent.

Embodiment 6 of Invention

A sixth embodiment of the present invention is a modification as a result of modifying the configuration of the opening control part (72) of the controller (70) of the second embodiment. Here, differences of the present embodiment with the second embodiment are described.

Figure 19:
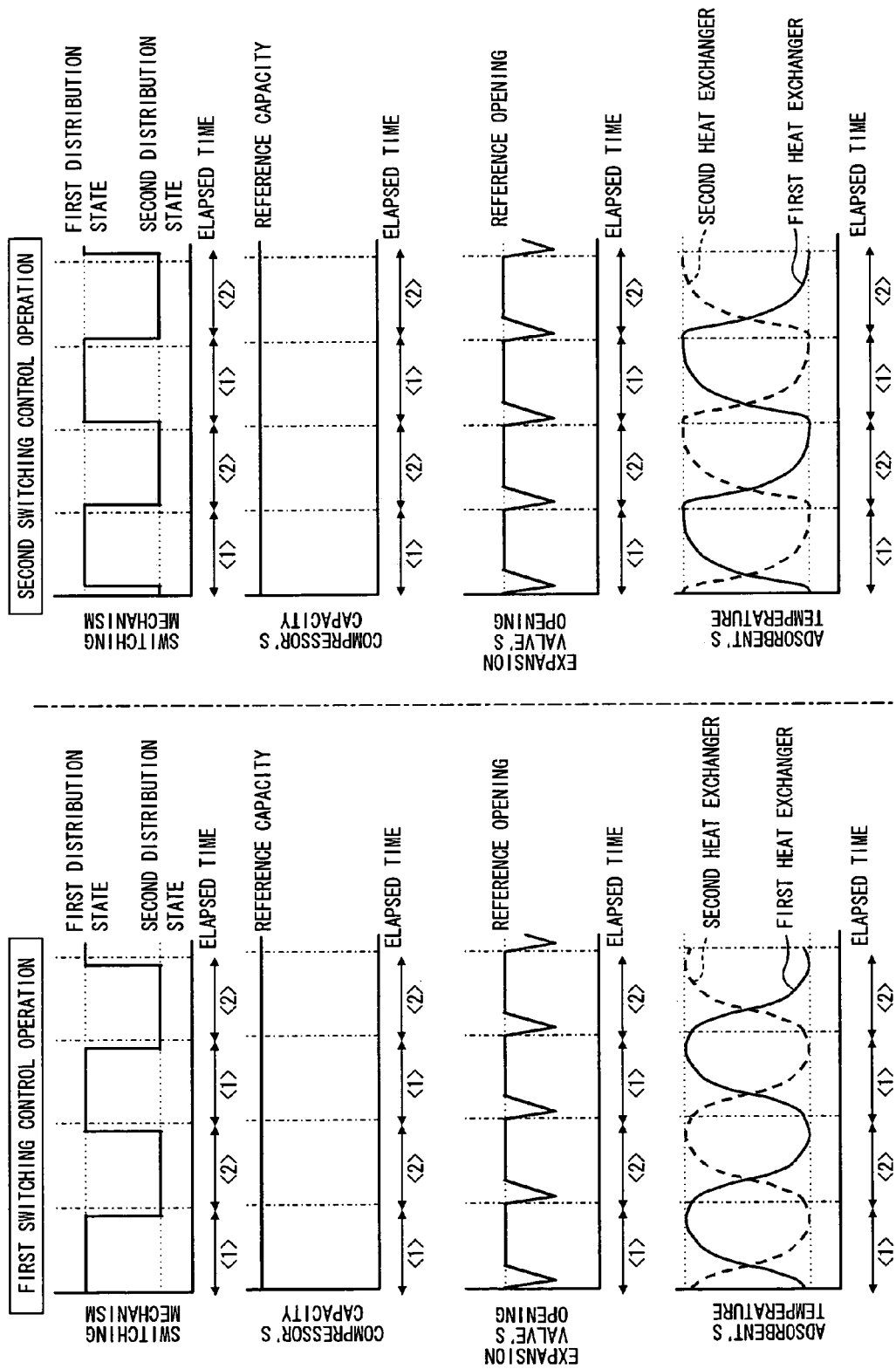
FIG. 19 is a time chart showing an operation state of a humidity controller apparatus in a sixth embodiment of the present invention.

As shown in FIG. 19, the opening control part (72) of the present embodiment constitutes an opening control means for varying the opening of the electric expansion valve (65) at the same cycle as the cycle at which the refrigeration cycle operation of the refrigerant circuit (60) is switched.

More specifically, the opening control part (72) of the present embodiment once reduces the opening of the electric expansion valve (65) immediately after the operation of the refrigerant circuit (60) is switched and then increases it again. Thereafter, the opening control part (72) holds the opening of the electric expansion valve (65) at a reference opening level until the next operation switching. In other words, the opening control part (72) performs a control operation for continuously reducing the opening of the electric expansion valve (65) from the time immediately after switching of the refrigeration cycle operation of the refrigerant circuit (60) and then reopening the electric expansion valve (65) when the opening of the electric expansion valve (65) reaches a predetermined opening level so that the opening of the electric expansion valve (65) is brought back to the original opening level. The opening control part (72) performs the control operation every time the refrigeration cycle operation of the refrigerant circuit (60) is switched. In addition, the opening control part

(72) repeatedly performs the control operation, independently of whether the switching control part (73) is in a first switching control operation or in a second switching control operation.

In the present embodiment, the opening control part (72) temporarily reduces the opening of the electric expansion valve (65) at the stage immediately after switching of the refrigeration cycle operation of the refrigerant circuit (60) where rapid heating or cooling of the adsorbent is required. As the opening of the electric expansion valve (65) decreases, the high-low pressure difference in the refrigeration cycle increases, and the temperature of refrigerant condensation rises while on the other hand the temperature of refrigerant evaporation drops. Accompanied with this, the temperature of the adsorbent rises quickly in the heat exchanger (61, 62) switched to a condenser while on the other hand the temperature of the adsorbent drops quickly in the heat exchanger (61, 62) switched to an evaporator. Therefore, in accordance with the present embodiment, it becomes possible to reduce the time from when the refrigeration cycle operation of the refrigerant circuit (60) is switched to when the adsorbent reaches a temperature capable of allowing the adsorbent to effect sufficient moisture adsorption/desorption. As a result, the humidity control capability of the humidity controller apparatus (10) is improved to a further extent.

Modified Version of Embodiment 6

In the present embodiment, the capacity control part (71) of the controller (70) may be configured in the same way as in the fifth embodiment. In other words, the capacity control part (71) of the present embodiment may be configured such that the capacity of the compressor (63) varies at the same cycle as the cycle at which the refrigeration cycle operation of the refrigerant circuit (60) is switched. And, in the present modified version, both the controlling of the opening of the electric expansion valve (65) by the opening control part (72) and the controlling of the capacity of the compressor (63) by the capacity control part (71) are performed in response to switching of the operation of the refrigerant circuit (60).

Other Embodiments of Invention

In each of the third to sixth embodiments, the switching control part (73) is configured such that the operation of the refrigerant circuit (60) and the distribution routes of first and second air streams are switched at different timing intervals; however, the switching control part (73) may be configured in the same way as the one described in the first embodiment. In other words, the switching control part (73) may be configured such that the operation of the refrigerant circuit (60) and the distribution routes of first and second air streams are switched at the same timing interval.

In addition, each of the aforesaid embodiments is an example as a result of application of the present invention to the humidity controller apparatus (10) of the type in which the heat exchanger (61, 62) with an adsorbent supported on its surface constitutes an adsorption unit. It, however, should be noted that the scope of application of the present invention is not limited to such a type of the humidity controller apparatus (10). In other words, the present invention may be applied to a humidity controller apparatus as disclosed in Patent Document III, e.g., a type of humidity controller apparatus in which each adsorption unit is formed by an adsorption element for bringing air streams flowing through a great number of air passages formed therein into contact with an adsorbent so that a first air stream is dehumidified in the adsorption element and a second air stream heated is supplied to the adsorption element for regenerating the adsorbent.

INDUSTRIAL APPLICABILITY

As has been described above, the present invention is useful for humidity controller apparatuses which regulate the humidity of air.

What is claimed is:

1. A humidity controller apparatus which takes in a first air stream and a second air stream and supplies to an indoor space either the first air stream dehumidified or the second air stream humidified,
    wherein:
    the humidity controller apparatus comprises a first adsorption unit and a second adsorption unit, each of the first and second adsorption units having a respective adsorbent which is brought into contact with air,
    the humidity controller apparatus is configured to perform, repeatedly alternately at a predetermined switching time interval, a first operation in which the second air stream is humidified as a result of regeneration of the adsorbent of the first adsorption unit while, simultaneously, the first air stream is dehumidified in the second adsorption unit and a second operation in which the second air stream is humidified as a result of regeneration of the adsorbent of the second adsorption unit while, simultaneously, the first air stream is dehumidified in the first adsorption unit, and
    the humidity controller apparatus is provided with interval set means for setting the predetermined switching time interval depending on the load of the humidity controller apparatus.

2. The humidity controller apparatus of claim 1 wherein the interval set means is configured to set the predetermined switching time interval such that the set value of the predetermined switching time interval decreases as the load of the humidity controller apparatus increases.

3. The humidity controller apparatus of claim 1 wherein:
    the humidity controller apparatus comprises a refrigerant circuit in which a plurality of heat exchangers each supporting on its surface a respective adsorbent are connected, the refrigerant circuit allowing for switching between a first refrigeration cycle operation in which the first heat exchanger becomes a condenser while the second heat exchanger becomes an evaporator and a second refrigeration cycle operation in which the second heat exchanger becomes a condenser while the first heat exchanger becomes an evaporator, and
    the refrigerant circuit performs a first refrigeration cycle operation during the first operation while, on the other hand, the refrigerant circuit performs a second refrigeration cycle operation during the second operation, and the first heat exchanger and the second heat exchanger constitute, respectively, a first adsorption unit and a second adsorption unit.

4. The humidity controller apparatus of claim 3 comprising:
    a switching mechanism for switching of the distribution routes of the first and second air streams in response to interswitching between the first operation and the second operation, and
    switching control means for performing a control operation so that the switching mechanism preswitches the distribution routes of air streams a predetermined length of time ahead of switching of the operation of the refrigerant circuit, when the second air stream has a higher temperature than the first air stream on the upstream side of the heat exchangers.

5. The humidity controller apparatus of claim 3 comprising:
- a switching mechanism for switching of the distribution routes of the first and second air streams in response to interswitching between the first operation and the second operation, and
- switching control means for performing a control operation so that the switching mechanism preswitches the distribution routes of air streams a predetermined length of time ahead of switching of the operation of the refrigerant circuit, when the second air stream has a higher temperature than the first air stream on the upstream side of the heat exchangers.

6. The humidity controller apparatus of claim 3 wherein:
- a compressor, disposed in the refrigerant circuit, is configured to be variable in capacity, and
- capacity control means is provided which varies the capacity of the compressor at the same cycle as the cycle at which the operation of the refrigerant circuit is switched.

7. The humidity controller apparatus of claim 3 wherein:
- a refrigerant expansion mechanism, disposed in the refrigerant circuit, is formed by an expansion valve which is variable in opening, and
- opening control means is provided which varies the opening of the expansion valve at the same cycle as the cycle at which the operation of the refrigerant circuit is switched.

* * * * *